(12) United States Patent
Wahls

(10) Patent No.: US 9,028,194 B2
(45) Date of Patent: *May 12, 2015

(54) SHUTTLE BIN

(76) Inventor: Stephen L. Wahls, Loomis, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,453

(22) Filed: Sep. 7, 2012

(65) Prior Publication Data

US 2012/0328398 A1 Dec. 27, 2012

Related U.S. Application Data

(63) Continuation of application No. 12/255,137, filed on Oct. 21, 2008, now Pat. No. 8,287,225.

(60) Provisional application No. 61/027,657, filed on Feb. 11, 2008.

(51) Int. Cl.
| | |
|---|---|
| *B65G 65/23* | (2006.01) |
| *B65D 88/56* | (2006.01) |
| *B65D 90/20* | (2006.01) |
| *B65B 69/00* | (2006.01) |

(52) U.S. Cl.
CPC ............. *B65D 88/56* (2013.01); *B65G 65/23* (2013.01); *B65B 69/0083* (2013.01); *B65D 90/205* (2013.01)

(58) Field of Classification Search
USPC .......... 298/1 B; 414/416.09, 416.1, 420, 422, 414/425, 527, 810
See application file for complete search history.

(56) References Cited

U.S. PATENT DOCUMENTS

| | | | |
|---|---|---|---|
| 1,088,100 A | 2/1914 | Saunders et al. | |
| 2,573,584 A | 10/1951 | Le Tourneau | |
| 2,947,571 A * | 8/1960 | Hagen ............................. | 298/10 |
| 3,083,849 A | 4/1963 | Mottin | |
| 3,312,263 A | 4/1967 | Wahlstrom | |
| 3,549,030 A | 12/1970 | Burkhalter et al. | |
| 3,753,593 A | 8/1973 | Wells et al. | |
| 3,779,409 A | 12/1973 | Herpich et al. | |
| 4,034,880 A | 7/1977 | Frenette | |
| 4,124,185 A | 11/1978 | Preisinger | |
| 4,148,527 A * | 4/1979 | Steele ............................. | 298/10 |
| 4,314,788 A | 2/1982 | Williams et al. | |
| 4,946,331 A | 8/1990 | Johnson | |
| 5,265,940 A | 11/1993 | Ostermeyer | |
| 5,312,162 A | 5/1994 | Baebel | |
| 5,338,140 A | 8/1994 | Ekdahl et al. | |
| 5,445,398 A | 8/1995 | Pierce | |
| 5,573,365 A | 11/1996 | Michalski | |
| 5,735,663 A | 4/1998 | Zachhuber | |

(Continued)

OTHER PUBLICATIONS

"Development of a Prototype Specialist Shuttle Vehicle for Chipped Woodfuel" Mar. 2002, DTI Sustainable Energy Programmes, Project Profile 048, DTI/PUB URN 02/672, 1 page.

*Primary Examiner* — James Keenan
(74) *Attorney, Agent, or Firm* — McKee, Voorhees & Sease, P.L.C.

(57) ABSTRACT

An apparatus such as a shuttle bin includes an upper frame, a lower frame hingeably connected to the upper frame, a storage body operatively connected to the upper frame for storing material and a roller assembly operatively connected to the upper frame. The roller assembly is adapted to draw the storage body taut to unload the material stored in the storage body as the upper frame hinges away from the lower frame. The storage body may be formed of a pliable material such as a mesh or canvas.

20 Claims, 32 Drawing Sheets

(56) References Cited

U.S. PATENT DOCUMENTS

| | | | |
|---|---|---|---|
| 6,422,802 B1 * | 7/2002 | Herrin | 414/419 |
| 6,468,019 B1 | 10/2002 | Duval | |
| 6,793,451 B2 | 9/2004 | Neufeldt | |
| 6,824,223 B2 | 11/2004 | Davidovic | |
| 6,877,534 B1 | 4/2005 | Hendrickson et al. | |
| 7,094,015 B2 * | 8/2006 | Hohmann et al. | 414/404 |
| 2009/0266820 A1 | 10/2009 | Osburn | |

* cited by examiner

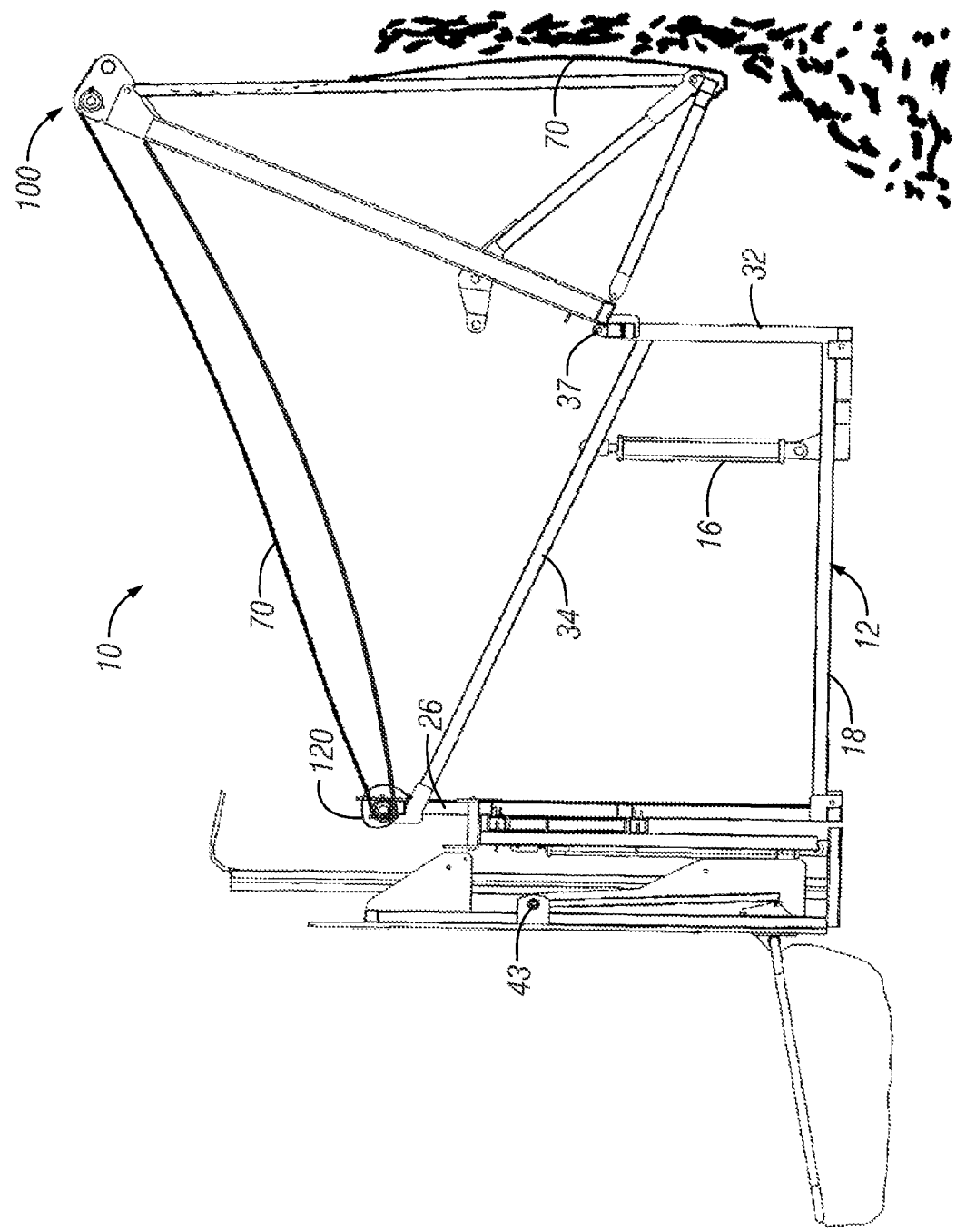

SHUTTLE BIN

CROSS-REFERENCE TO RELATED APPLICATIONS

This application is a continuation application of U.S. Ser. No. 12/255,137 filed Oct. 21, 2008. now U.S. Pat. No. 8,287,225 which application claims priority under 35 U.S.C. §119 to U.S. Provisional Patent Application No. 61/027,657, filed Feb. 11, 2008, and herein incorporated by reference in their entirety.

FIELD OF THE INVENTION

The present invention relates to unloading of materials.

BACKGROUND OF THE INVENTION

The present invention provides for a method and apparatus for the unloading of materials. To assist in understanding the present invention, problems which may be addressed by the present invention are discussed in the context of grass clippings. The present invention is not, however, limited to grass clippings as it may be used for unloading of other types of materials, including, but not limited to, particulate matter or other types of materials which do not flow well.

In lawn care services, grass clippings are collected, transported, and unloaded. The disposal of grass clippings is a part of the lawn care service. Unloading a trailer full of grass clippings can take 5 to 10 or more minutes to manually unload. This aspect of handling grass clippings adds cost and time to lawn care services.

Another problem with transporting and unloading grass clippings is that the grass quickly begins to decompose. Decomposing clippings clump and cling together. This also results in an odor and grass clippings which stick to containers in which the clippings are transported as well as individuals who manually unload the clippings. It is further observed that grass clippings, or other types of chopped forage material do not flow well, thus even if dumped from a container, manual labor is needed to more completely remove the material from the container. Thus, to remove grass clippings the container in which they are transported may require frequent cleaning such as through pressure washing, further adding to the time and cost of providing lawn care services. The problems may become even more pronounced where grass clippings are left within the container for extended periods of time allowing significant decay to occur before the container is emptied.

Similar problems are encountered with the unloading of other types of materials from wagons or other types of containers.

What is needed is an apparatus and method for unloading grass clippings and other types of materials which addresses problems with unloading.

Therefore, it is a primary object, feature, or advantage of the present invention to improve over the state of the art.

It is a further object, feature, or advantage of the present invention to provide an apparatus and method for loading grass clippings or other types of materials into a bin or container.

A still further object, feature, or advantage of the present invention is to provide an apparatus and method for unloading grass clippings or other types of materials from a bin or other container.

One or more of these and/or other objects, features, or advantages of the present invention will become apparent from the specification and claims that follow. No single embodiment need exhibit all of these objects, features, or advantages.

BRIEF SUMMARY OF THE INVENTION

According to one aspect of the present invention, an apparatus is provided. The apparatus includes an upper frame, a lower frame hingeably connected to the upper frame, a storage body operatively connected to the upper frame for storing material and a roller assembly operatively connected to the upper frame. The roller assembly is adapted to draw the storage body taut to unload the material stored in the storage body as the upper frame hinges away from the lower frame. The storage body may be formed of a pliable material such as a mesh or canvas.

According to another aspect of the present invention, an apparatus includes an upper frame, a lower frame hingeably connected to the upper frame, a cylinder operatively connected between the upper frame and the lower frame for raising and lowering the upper frame, a storage body operatively connected to the upper frame for storing material, the storage body formed of a pliable material, a roller assembly operatively connected to the upper frame, and a loading assembly operatively connected to the lower frame for loading the material into the storage body.

According to another aspect of the present invention, a method for operating a chipping bin is provided. The method includes loading particulate matter into a loading assembly of the chipping bin, raising the loading assembly, pivoting the loading assembly during raising the loading assembly to dump the particulate matter into a pliable storage body operatively connected to a frame of the chipping bin, lowering the loading assembly, pivoting an upper portion of the frame away from a lower portion of the frame, and rolling the pliable storage body using a roller as the upper portion of the frame pivots to assist in dumping the particulate matter from the pliable storage body.

BRIEF DESCRIPTION OF THE DRAWINGS

FIG. 33 is a side view of the storage body path about the first and second rollers.

DETAILED DESCRIPTION OF THE PREFERRED EMBODIMENT

Although the present invention is generally described with respect to grass clippings associated with lawn care, the present invention is not to be limited to this specific application. The present invention may be used with other types of materials. Although the present invention may be used with any number of types of material, one advantage of the present invention is that it may be used with particulate matter which has properties which make it resistant to being bulk flowable. Examples of such materials include chopped forage materials, silage, and other materials. Examples of properties of materials which are resistant to being bulk flowable include light weight (which hinders gravity flow) and moisture absorbent which can also hinder flow. However, the present invention may also be used with bulk flowable materials, including grain.

Figure 1:
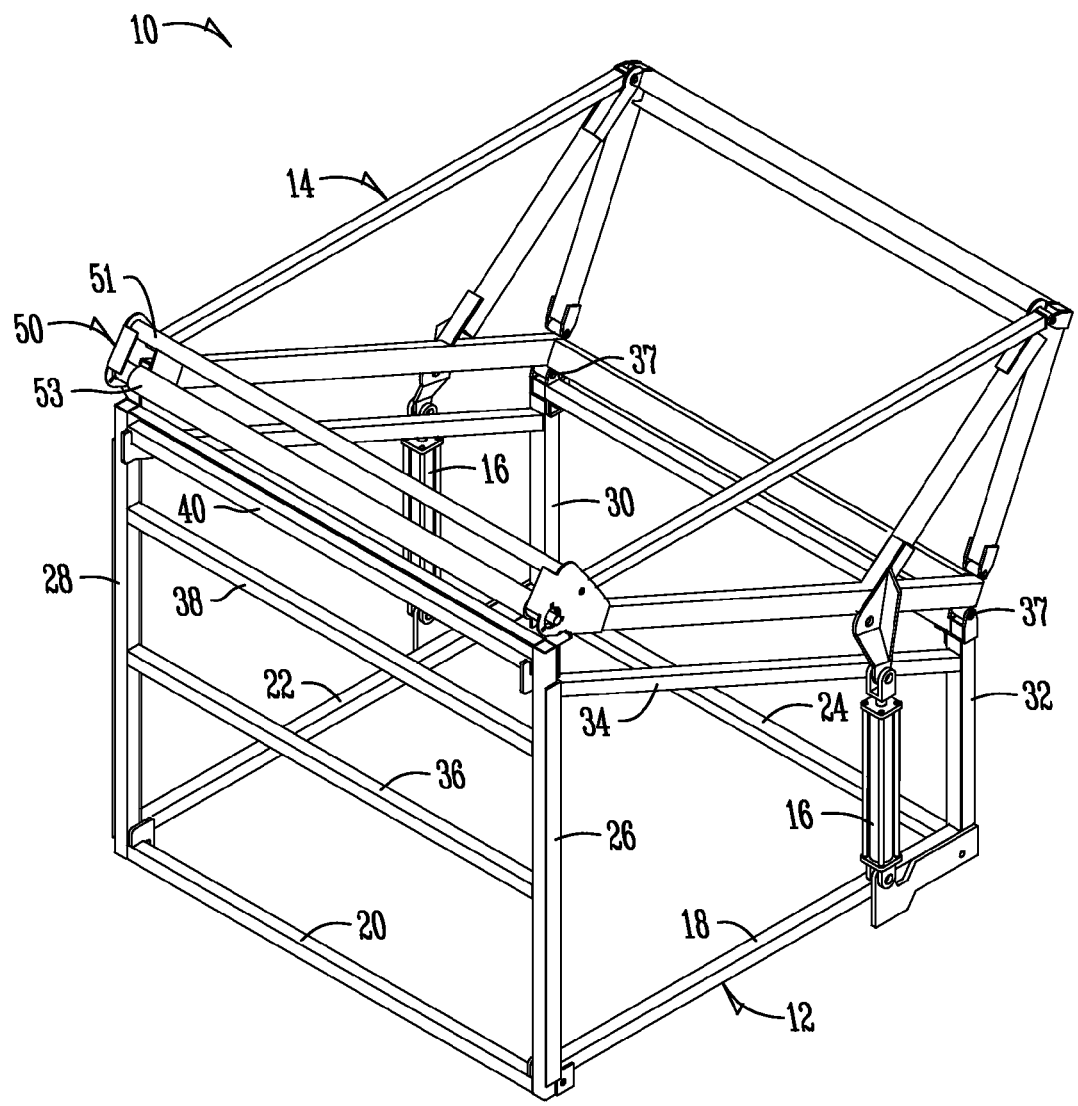
FIG. 1 is a perspective view illustrating a bin in a first position in which the bin may be loaded.

FIG. 1 is a perspective view of one embodiment of a shuttle bin 10. The shuttle bin is suitable for placing on or mounting to a trailer (not shown). When mounted on a trailer the shuttle bin may be configured to provide dumping to the side of the trailer or to the end of the trailer. When mounted to a trailer the shuttle bin may be configured for loading on the side of the trailer or at the end of the trailer, or multiple shuttle bins may be mounted on the trailer. Instead of mounting on a trailer, the shuttle bin may be mounted on or to a truck bed.

The shuttle bin 10 includes a lower frame 12 and an upper frame 14. The lower frame 12 is constructed by members 18, 20, 22, 24, 26, 28, 30, 32, 34, 36, 38, 39, 40. The upper frame 14 is hingeably connected to the lower frame 12 using hinges 37. In addition, cylinders 16 are operatively connected between the lower frame 12 and the upper frame 14 and are used to open the shuttle bin. At one end of the upper frame 14, a roller assembly 50 is positioned which includes a roller 53 and a guide 51. The upper frame 14 is an open frame and a storage body is operatively connected to the upper frame 14 and extends downwardly into the lower frame 12 when the shuttle bin is in the position shown in FIG. 1. The storage body is made of a pliable material. The roller assembly 50 provides for tightening the storage body as the shuttle bin 10 transitions into an unloading position.

Figure 2:
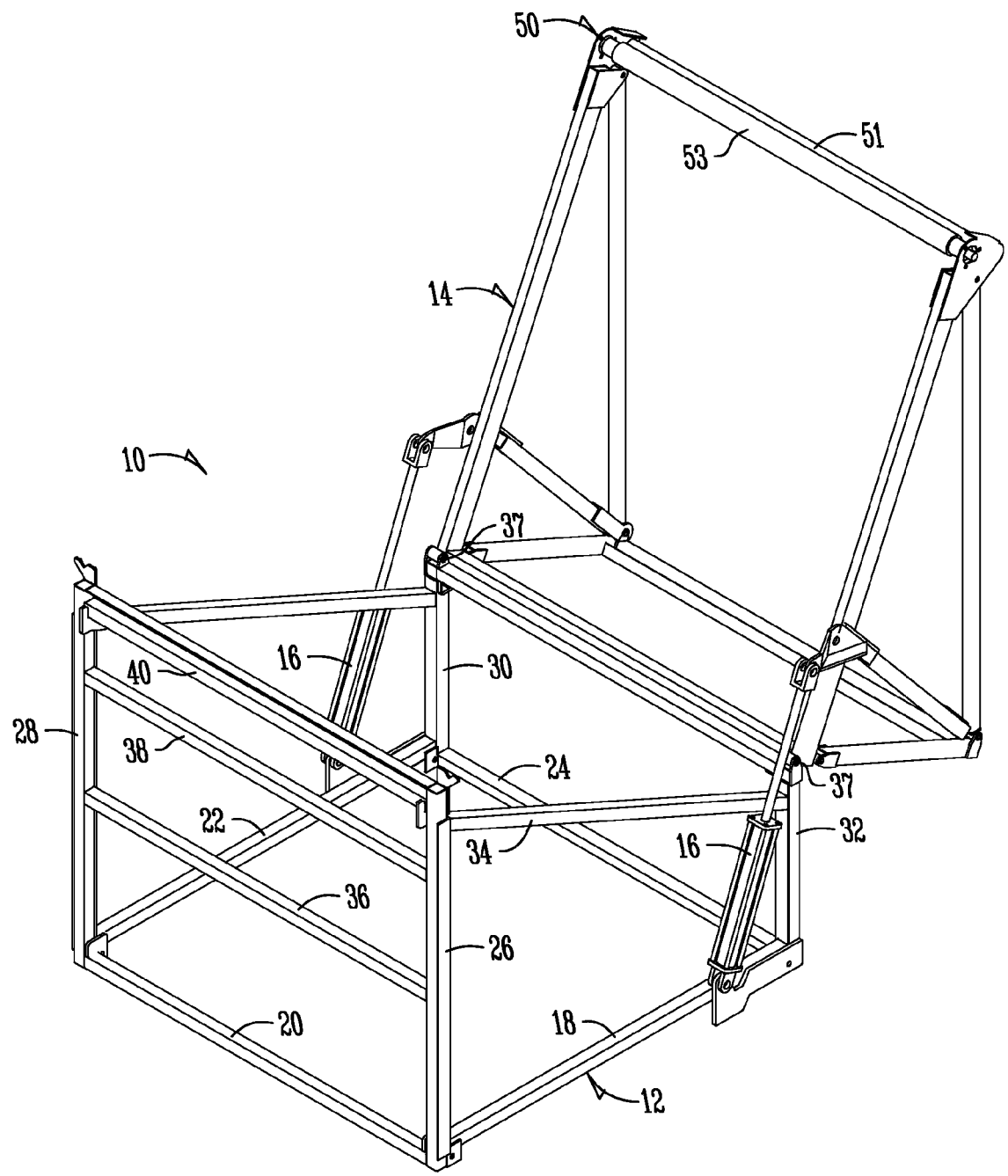
FIG. 2 is a perspective view illustrating the bin in a second position in which the bin may be unloaded.

FIG. 2 is a perspective view of the shuttle bin 10 in an open position in which the shuttle bin may be unloaded. Note that the cylinders 16 allow the shuttle bin 10 to hinge open for unloading.

Figure 3:
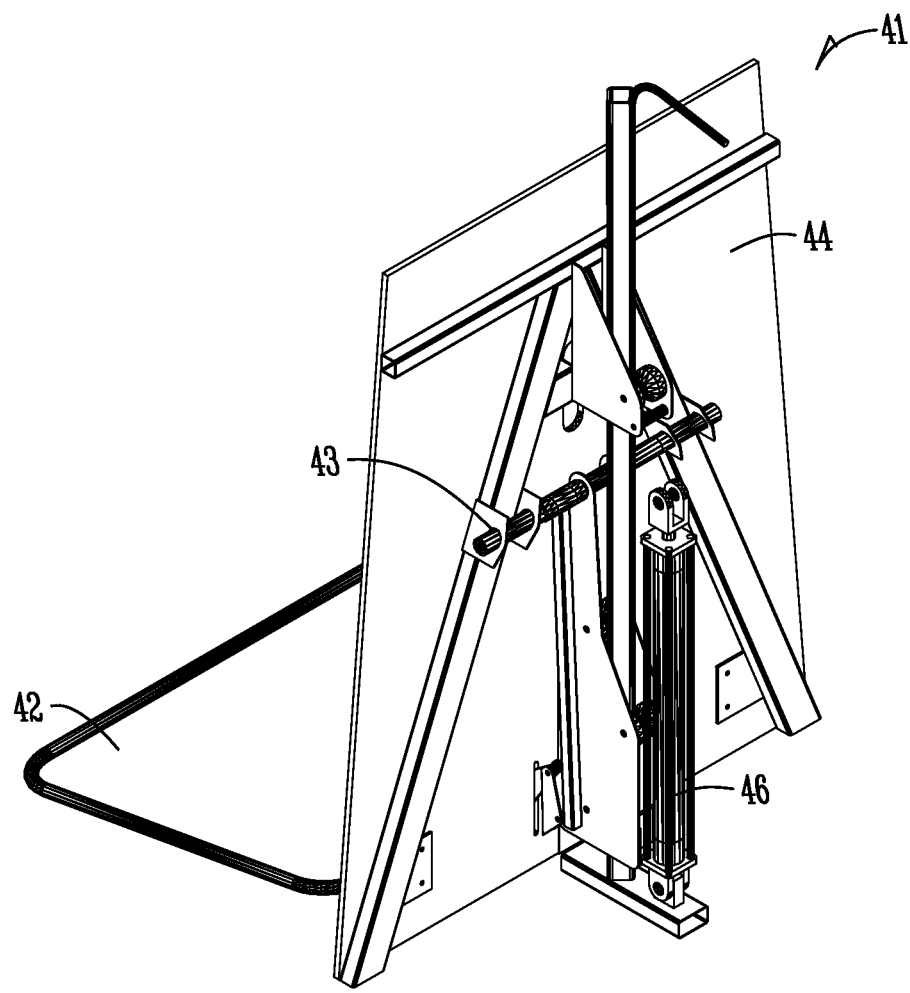
FIG. 3 is a perspective view of a loading assembly for loading the bin.
Figure 4:
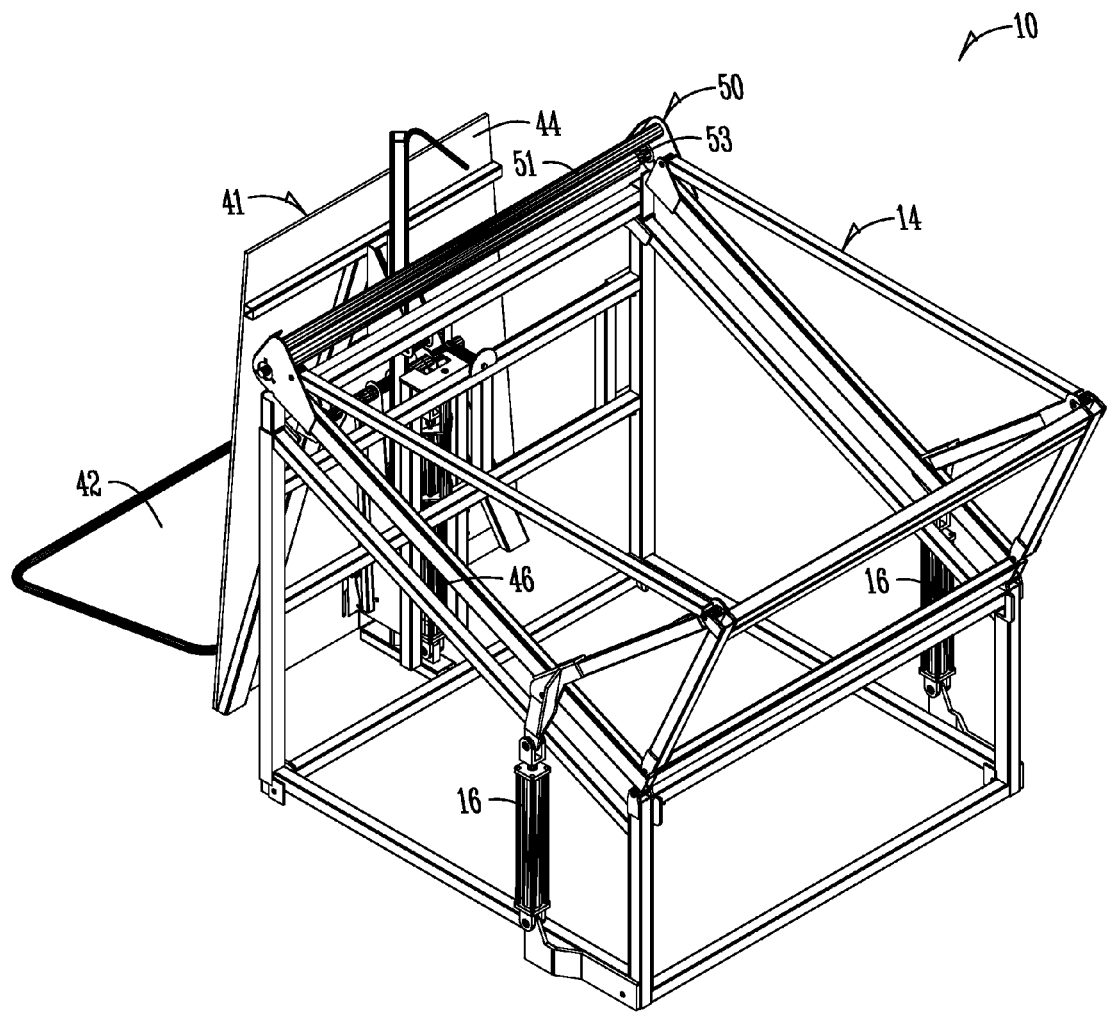
FIG. 4 is a perspective view of the loading assembly operatively connected to the bin.

FIG. 3 is a perspective view of a loading assembly 41. FIG. 4 shows the loading assembly 41 connected to the frame. The loading assembly 41 includes both a first support surface 42 and a back board 44. The loading assembly 41 is operative connected to the lower frame 12. The loading assembly 41 is raised and lowered such as by a loading actuator cylinder 46. The loading assembly 41 also includes a pivot member 43. Once the loading assembly is raised sufficiently with the loading actuator cylinder 46, the back board 44 can pivot due to the weight of a load on the loading assembly 41. As the member 44 pivots, material forming the load is emptied from the loading assembly 41 into a storage body. Thus, in this manner the storage body which is suspended from the upper frame 14 may be filled. The backboard functions as a loading chute. As shown, the width of the backboard decreases to facilitate flow of particulate matter into the bin. However, the width of the backboard need not decrease, and in some applications it is preferred that it does not. For example, where material is lightweight, in a windy environment it may be preferable to have the width of the backboard decrease, but doing so may result in the center of the bin being filled and not the edges. Thus, it may be preferable to not have the width of the backboard decrease along its length.

Figure 5:
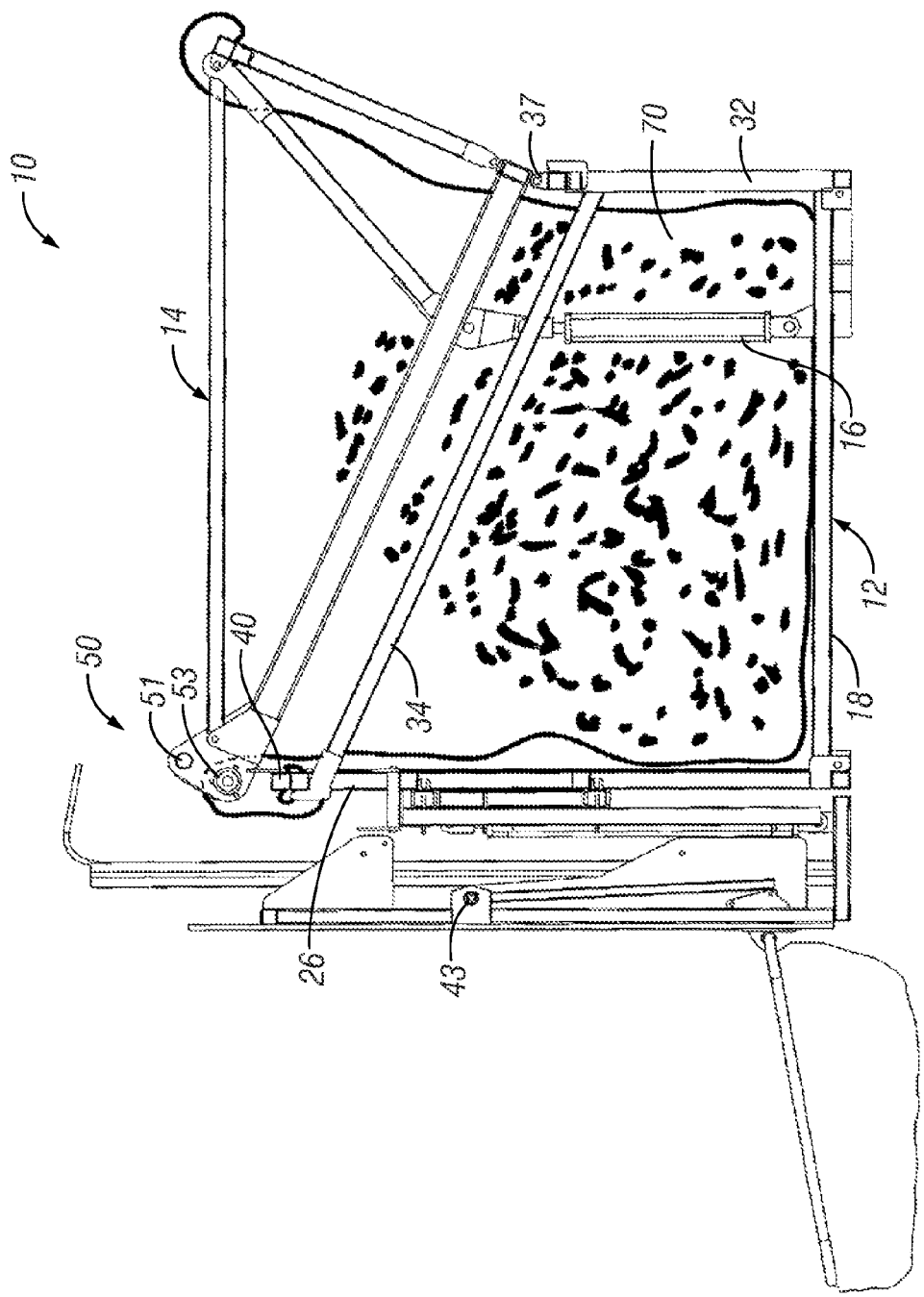
FIG. 5 is a side view of the bin in a storage position.

FIG. 5 is a side view illustrating the shuttle bin 10 with the storage body 70 in place. The storage body 70 is preferably a pliable, soft-sided material such as a fabric, textile, or plastic material. One example of a pliant, soft-sided textile material which may be used is a fiber mesh. A material such as fiber mesh allows air to contact the particulate matter. This is advantageous as it slows the biological deterioration of the particulate matter. Where the material is a textile, the textile may be of various types, and from various sources including animal, plant, mineral, and synthetic. Another example of a material that can be used is canvas. The present invention contemplates that other types of materials can be used. The present invention further recognizes that some of these materials are breathable and allows for air to easily permeate through the material so as to assist in slowing biological deterioration of the grass clippings or other particulate matter.

As shown in FIG. 5, the storage body 70 is configured such that it will hold particulate matter. The storage body 70 has a portion which is wrapped around a roller 50. The storage body 70 is connected along one side of the upper frame 14. The storage body 70 may be connected to the upper frame in any number of ways such as through use of any number of types of fasteners. An opposite end of the storage body 70 passes through a roller assembly 50 and is operatively connected to the lower frame 12. The storage body 70 may be connected to the lower frame in any number of ways such as through use of any number of types of fasteners or connectors. One convenient method of connecting the storage body 70 to the lower frame is through the use of bungee cords. This configuration with the storage body attached to the upper frame at one side and with the opposite side passing through a roller and connecting to the lower frame reduces the size of the storage area formed by the storage body as the bin opens. Thus, the storage body 70 is fed through the roller assembly 50 as the upper frame 14 is opened up from the lower body 12. This draws the storage body 70 taut as the contents of the storage body 70 facilitating dumping of the particulate matter contained within the storage body 70. The taut surface 72 of the storage body allows for emptying the storage body in a clean and effective manner to remove all or substantially all particles from the storage body. Because of the effectiveness of this unloading, little cleaning need be done, if any, thereby reducing the labor associated with using the shuttle bin 10.

Figure 6:
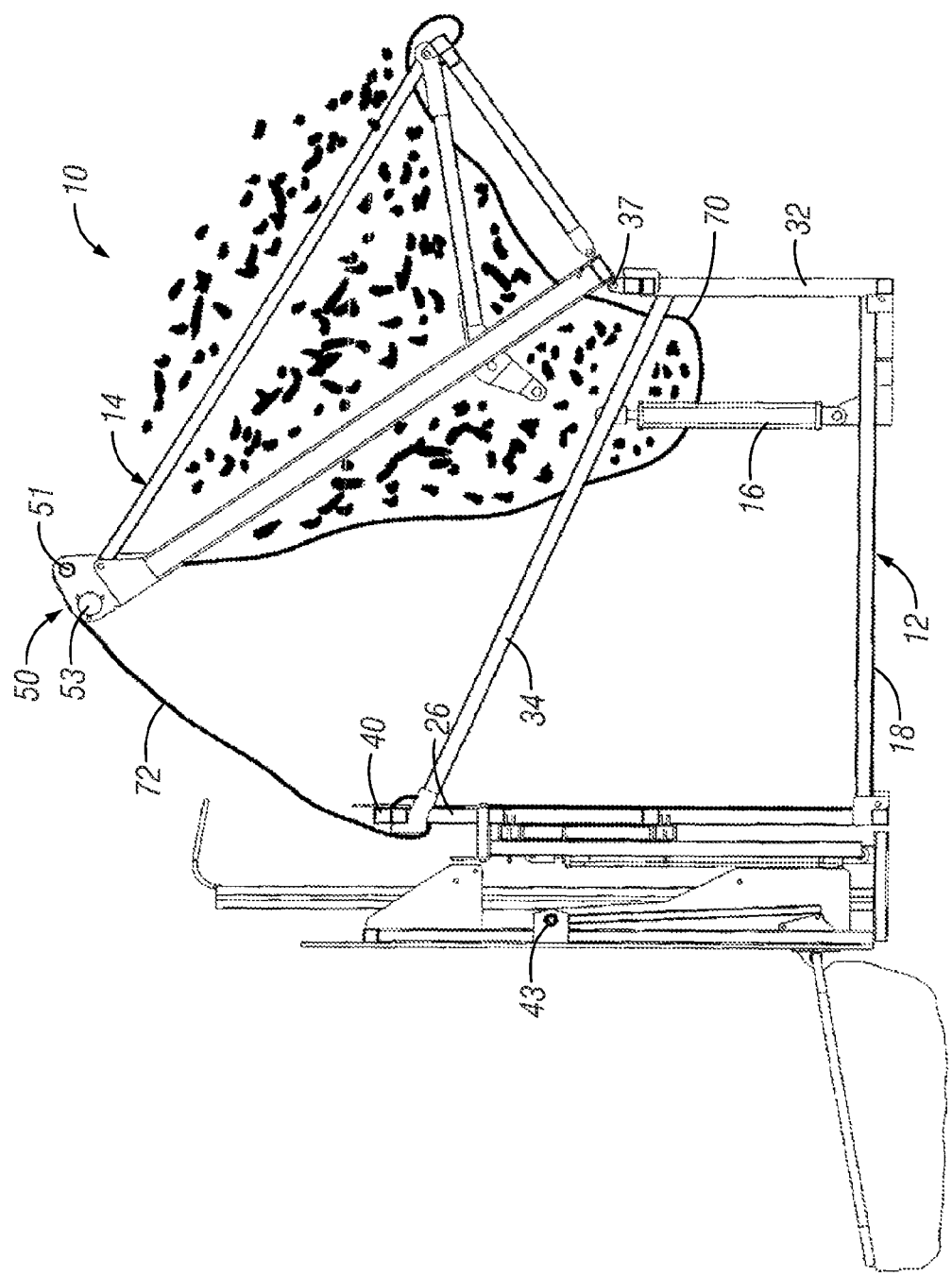
FIG. 6 is a side view of the bin transitioning towards a dump position.
Figure 7:
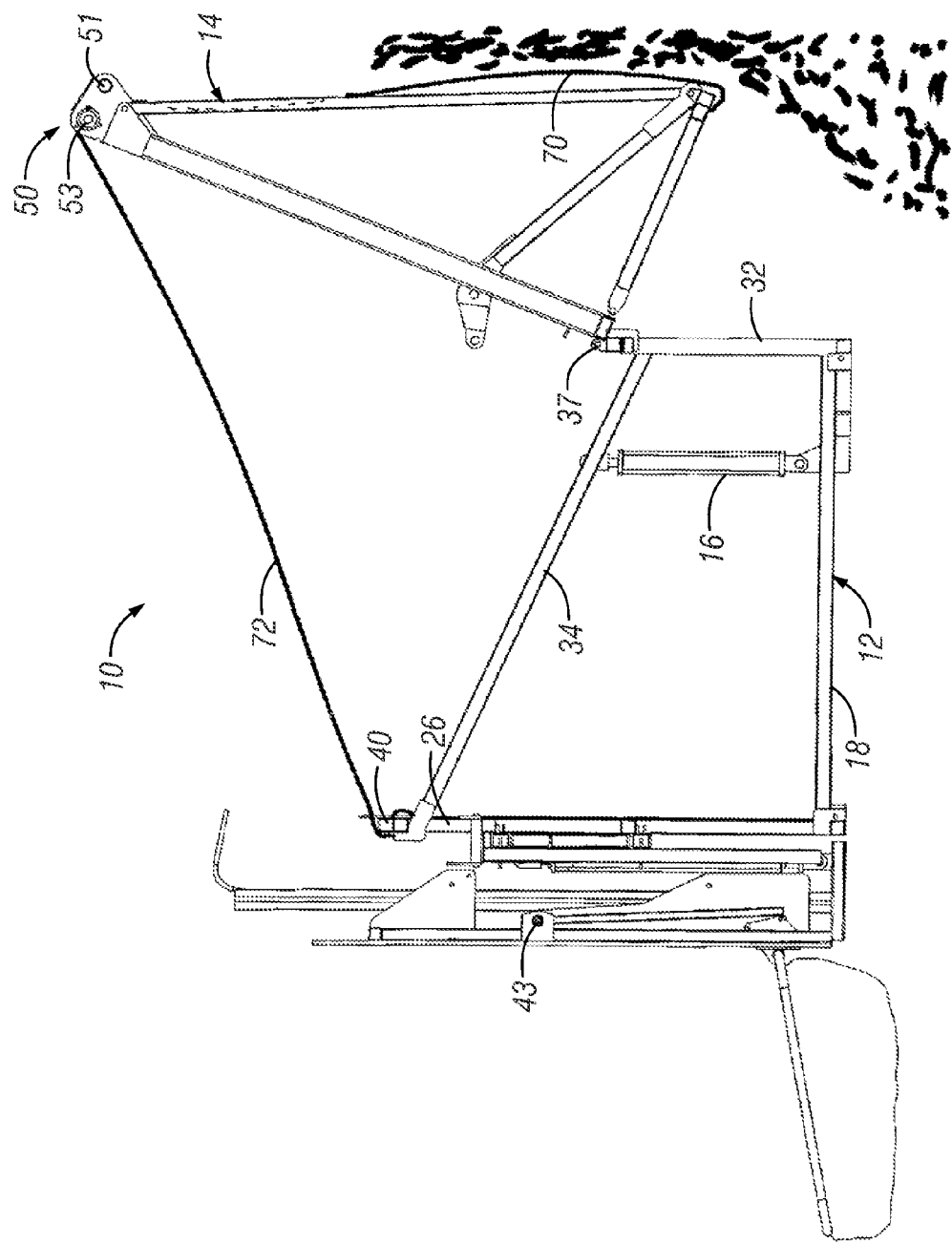
FIG. 7 is a side view of the bin in a dump position.

FIG. 5 through FIG. 7 show a progression of positions encountered during the dumping process. In FIG. 6, note that the size of the storage area provided by the storage body decreases as the bin opens for dumping. In FIG. 7, a substantially taut surface 72 is provided as the storage body is drawn through the roller so that all of the particulate matter may be dumped.

Figure 8:
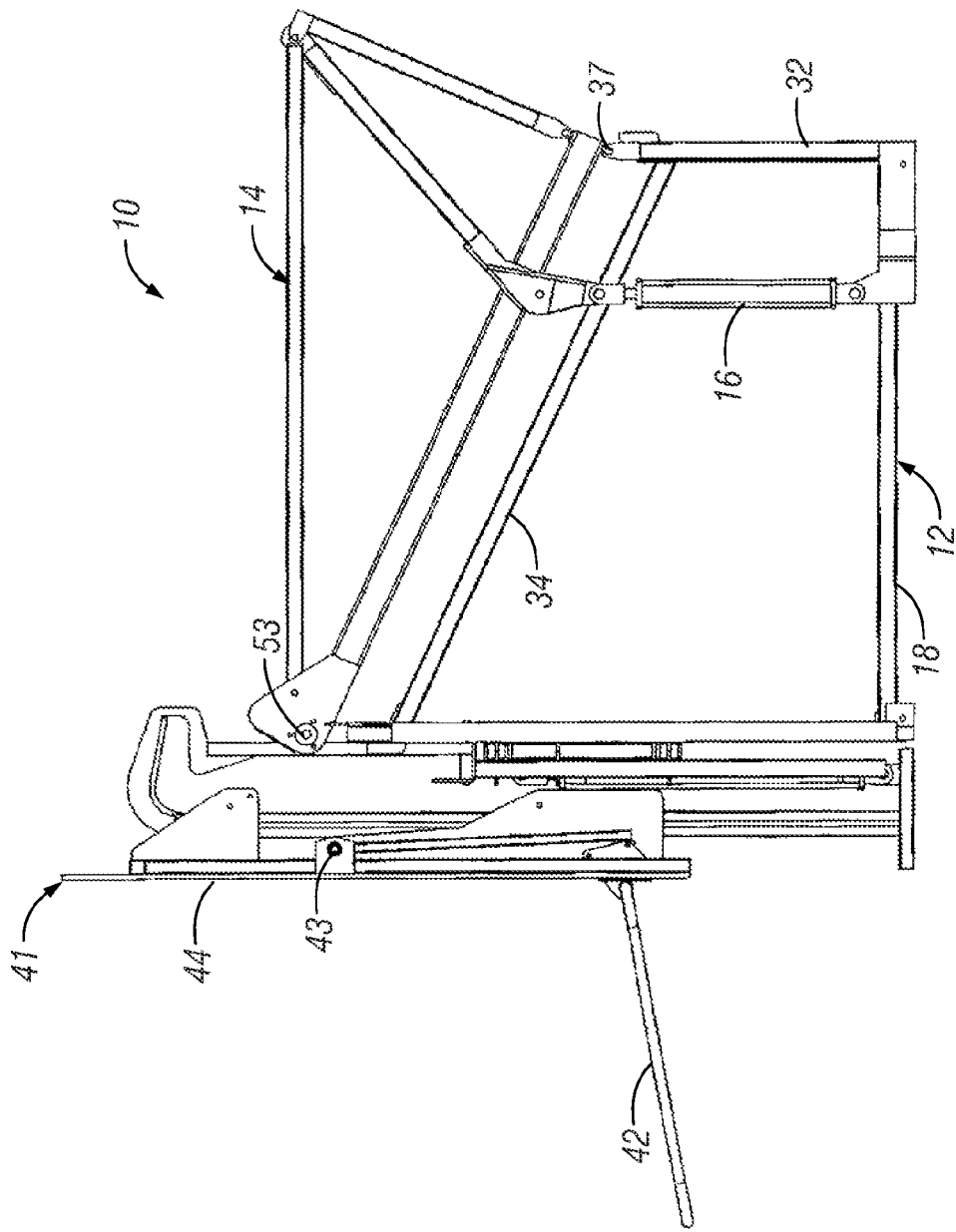
FIG. 8 is a side view with the lift transitioning upwardly.
Figure 9:
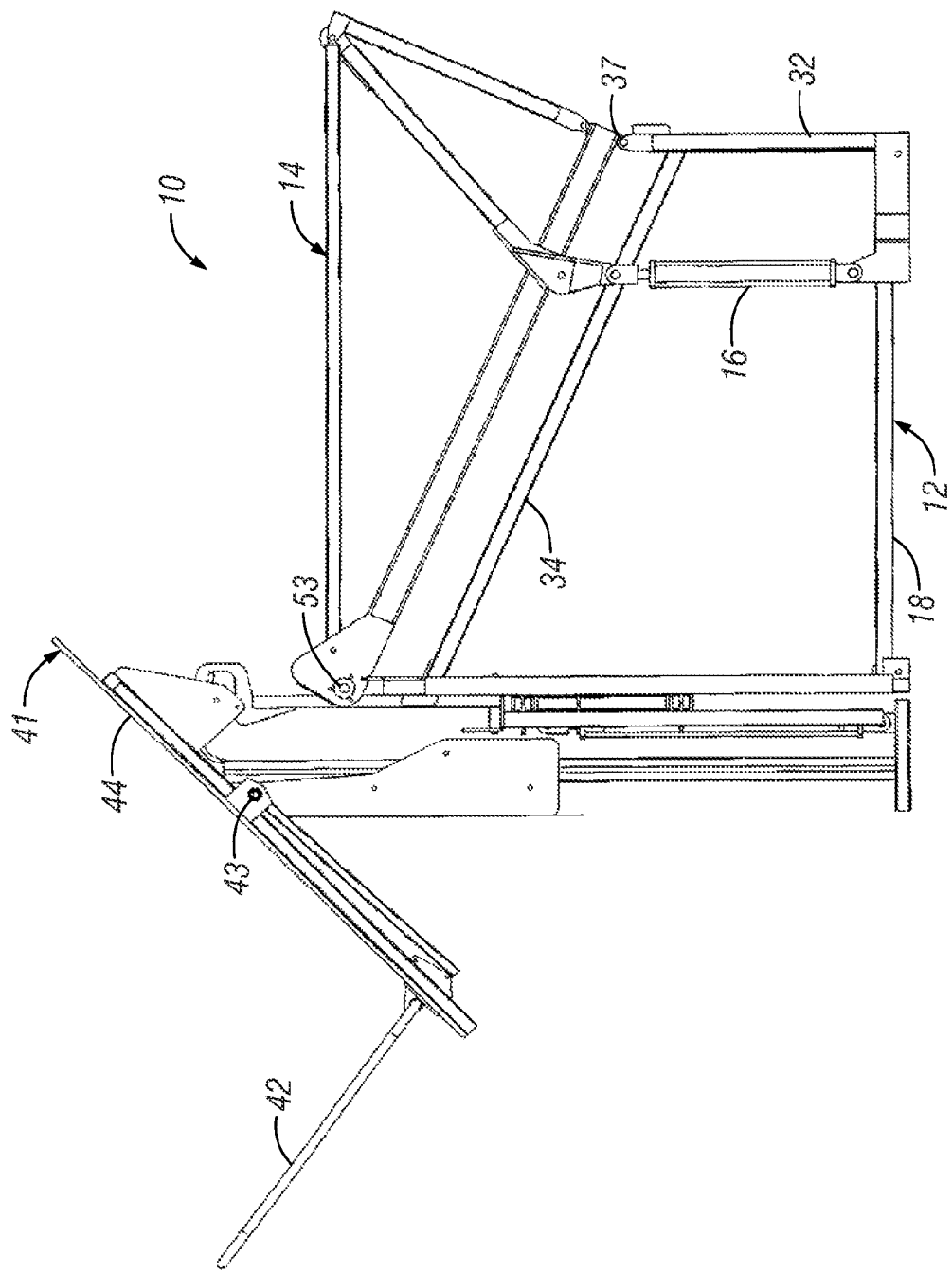
FIG. 9 is a side view with the lift pivoting inwardly.
Figure 10:
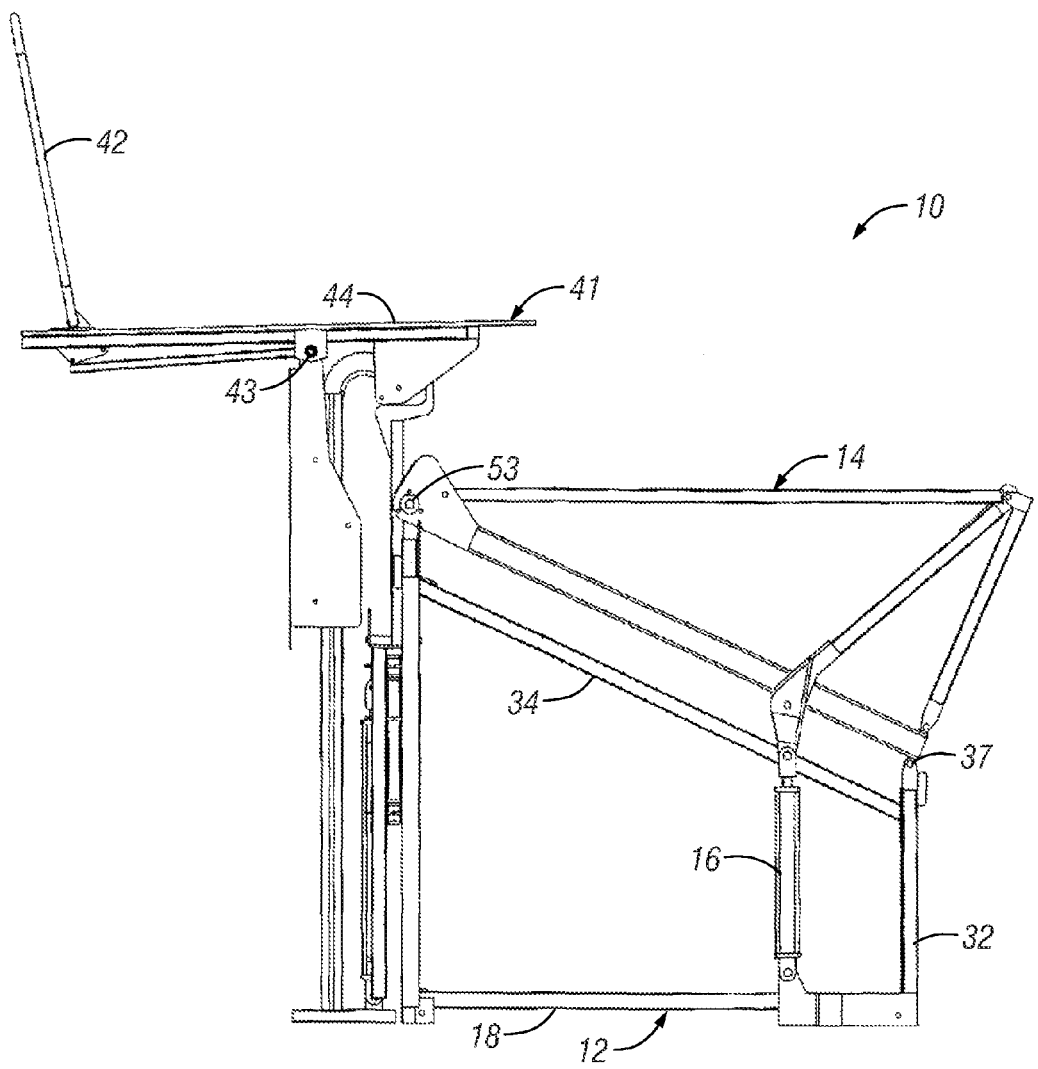
FIG. 10 is a side view with the lift pivoting further inwardly.
Figure 11:
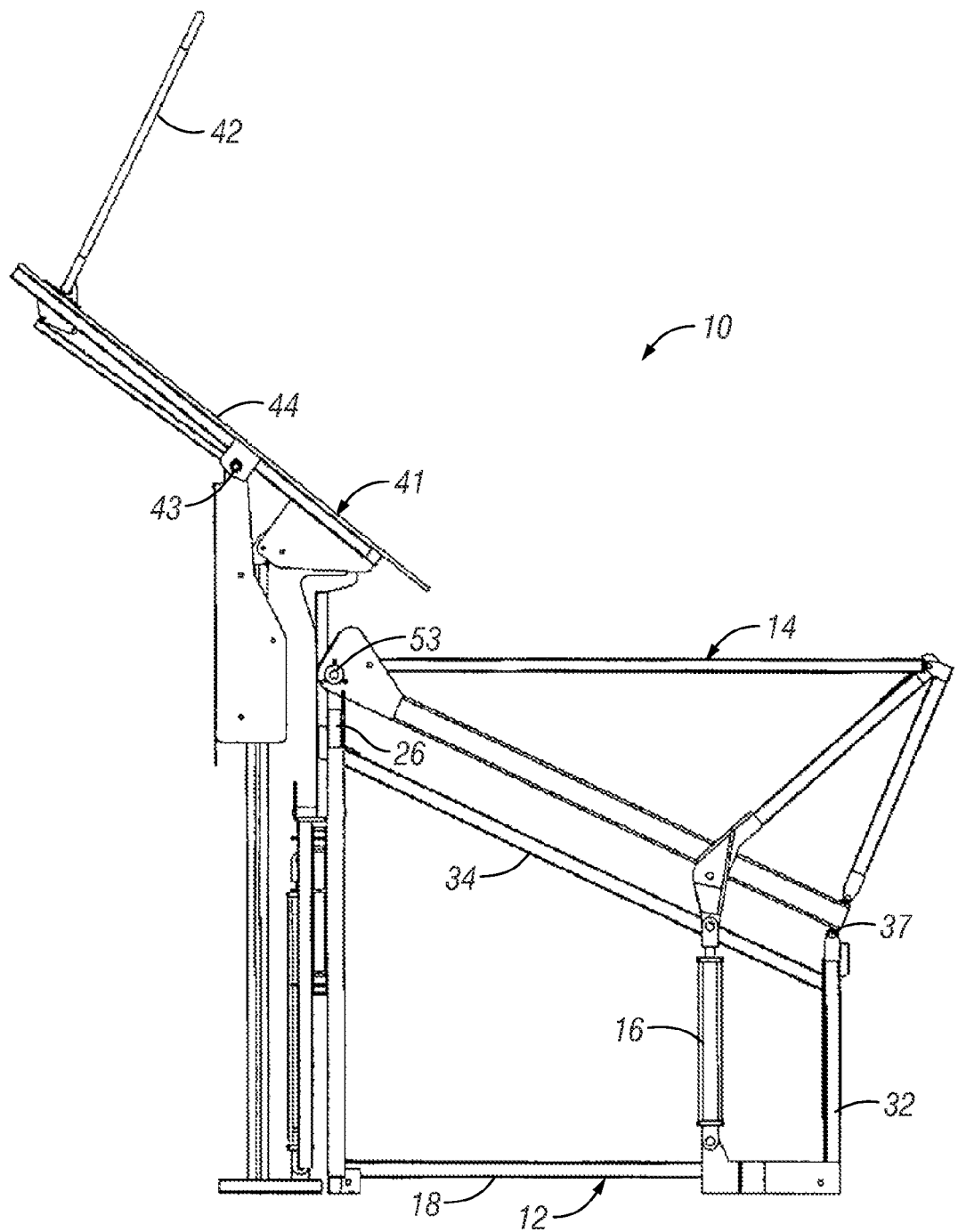
FIG. 11 is a side view with the lift pivoting further inwardly to empty particulate matter into the bin.

FIG. 8 illustrates the loading assembly 41 or loader operatively connected to the bin. FIG. 9 illustrates the loading assembly 41 at a position where the support surface 42 and backboard 44 have been raised upwardly and have began tilting on pivot 43 from a vertical position for the backboard 44 towards a horizontal position. FIG. 10 illustrates the loading assembly raised further upward with the backboard 44 pivoting on pivot 43 to a substantially horizontal position. FIG. 11 illustrates the loading assembly raised even further upward and pivoting on pivot so that the backboard 44 moves beyond the horizontal. As previously explained, the backboard 44 functions as a loading chute.

Figure 12:
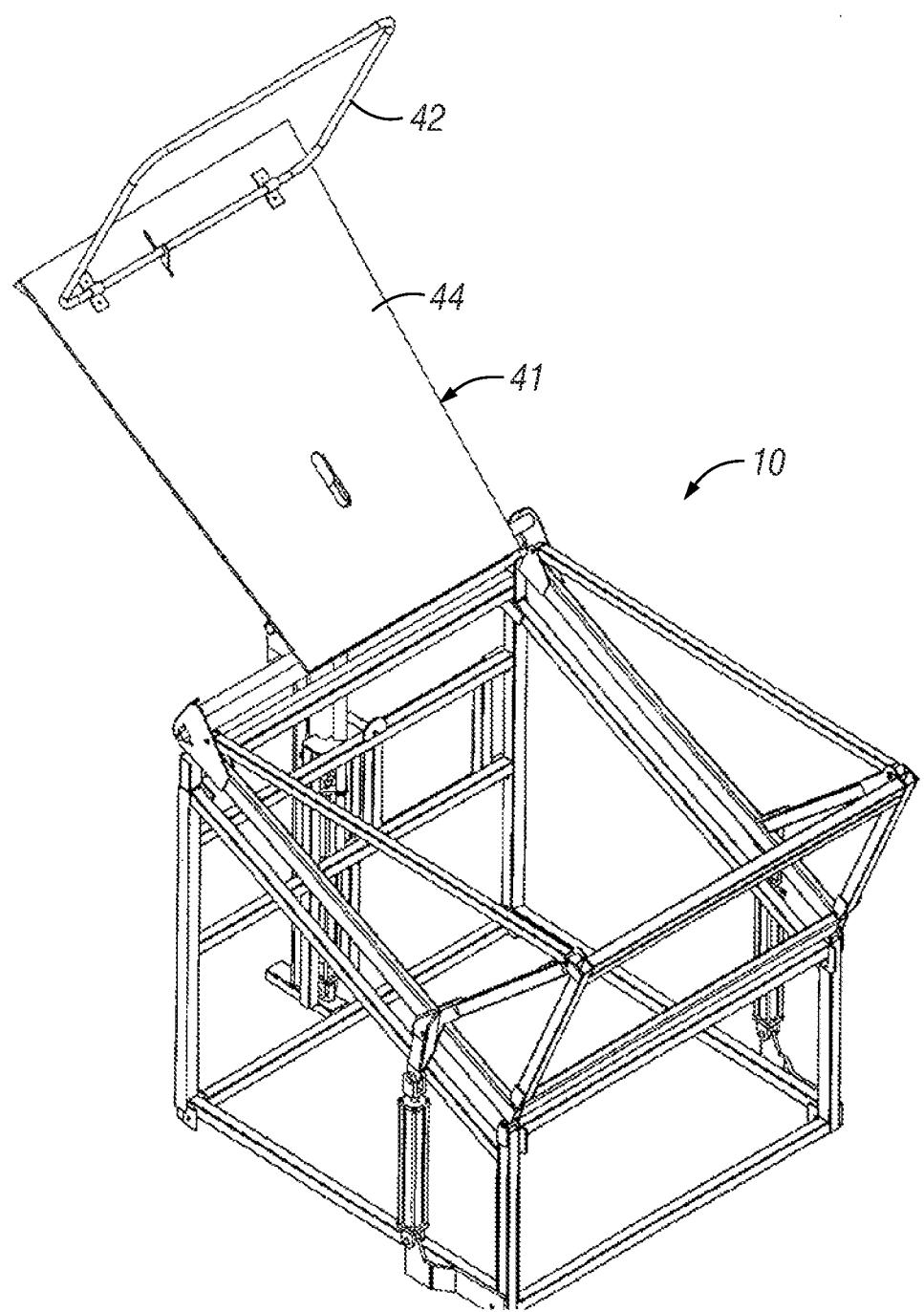
FIG. 12 is a perspective view with the lift raised and pivoted inwardly for loading particulate matter into the bin.

FIG. 12 is a perspective view with the lift 41 raised and pivoted inwardly for loading particulate matter into the bin 10. Note that the shape of the backboard 44 allows the backboard 44 to function as a loading chute.

Figure 13:
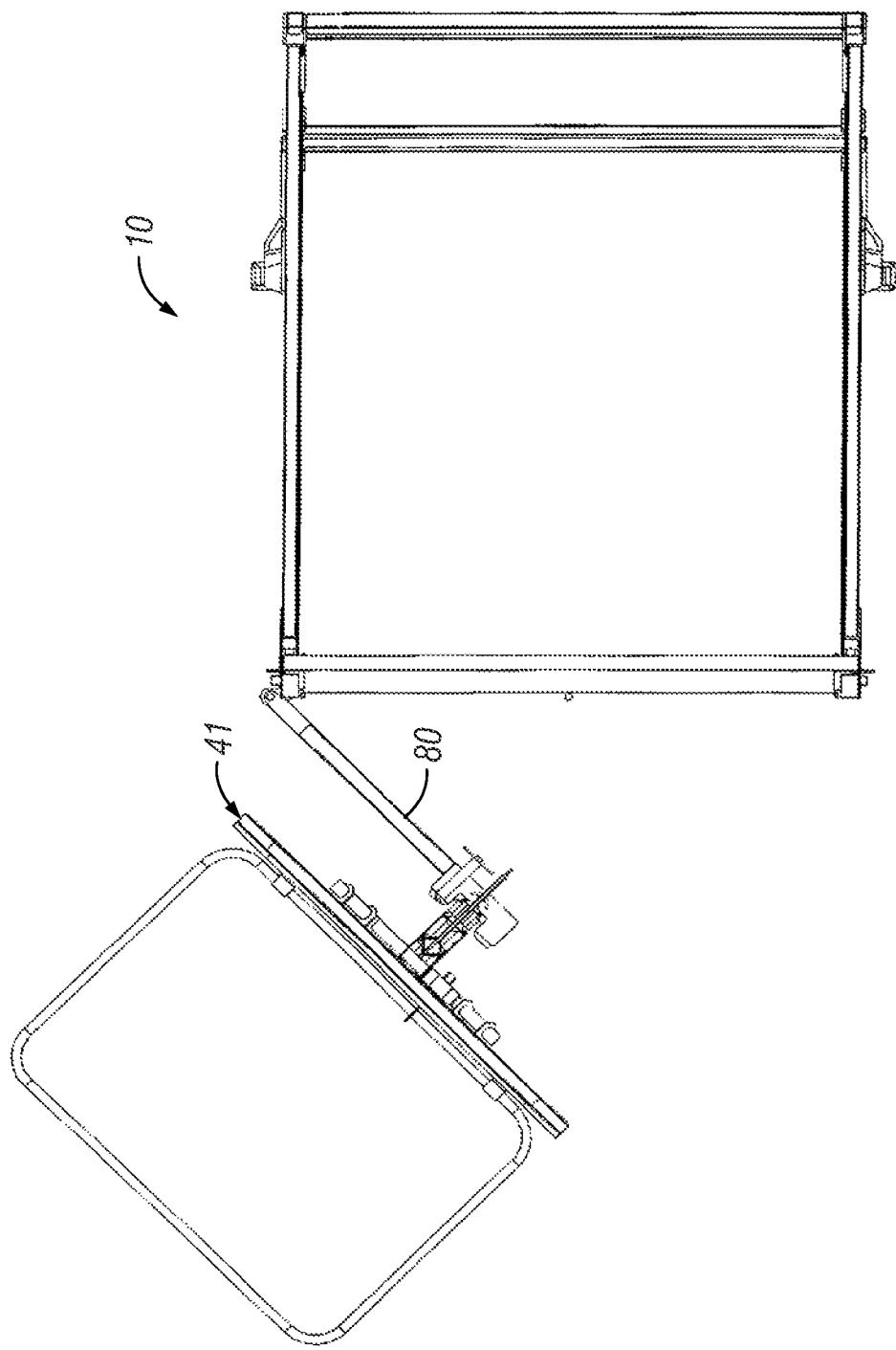
FIG. 13 is a top view of an articulated lift.

FIG. 13 is a top view of an articulated lift which includes an articulated joint 80.

Figure 14:
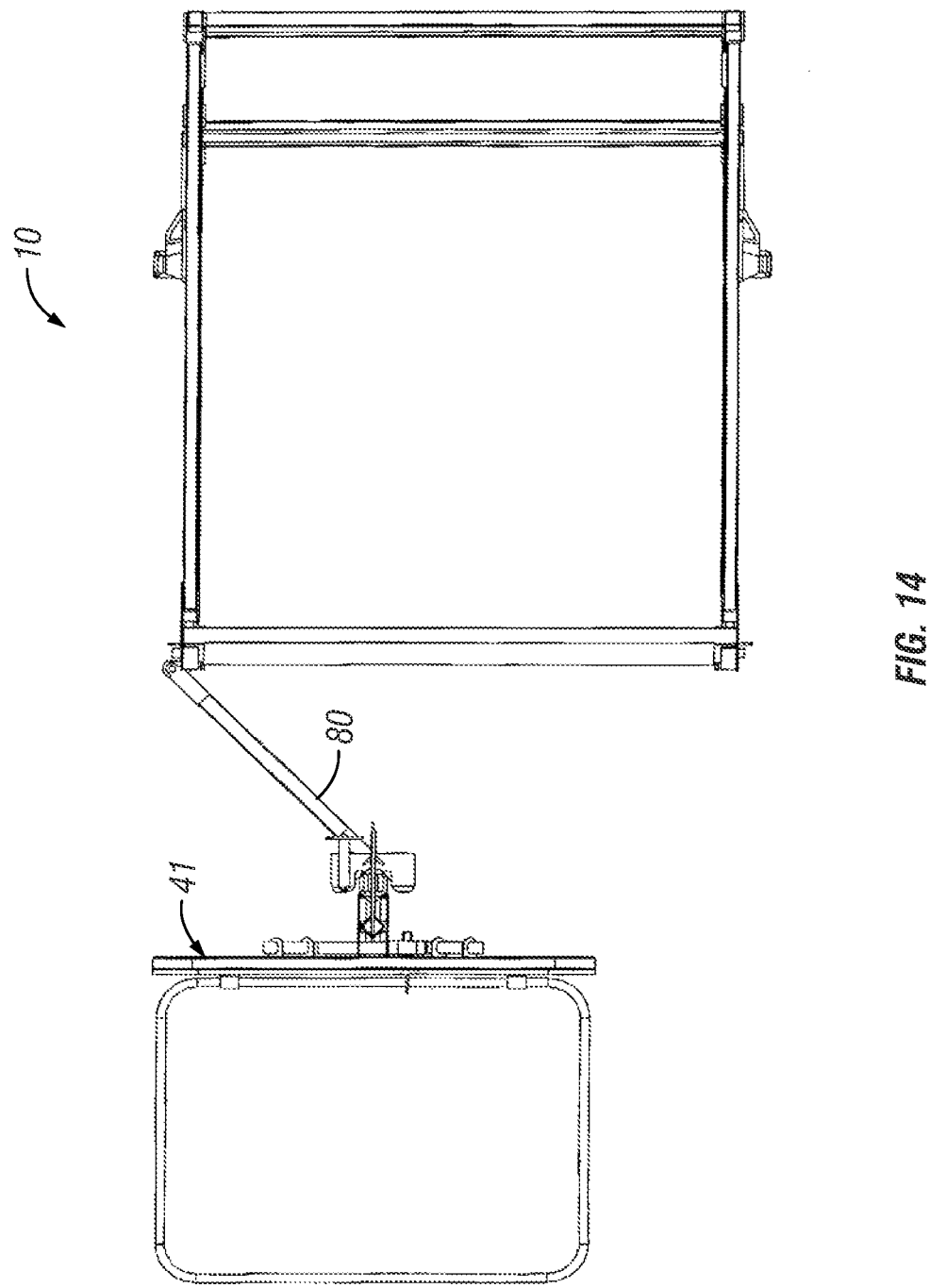
FIG. 14 is a top view of the articulated lift in a different position.
Figure 15:
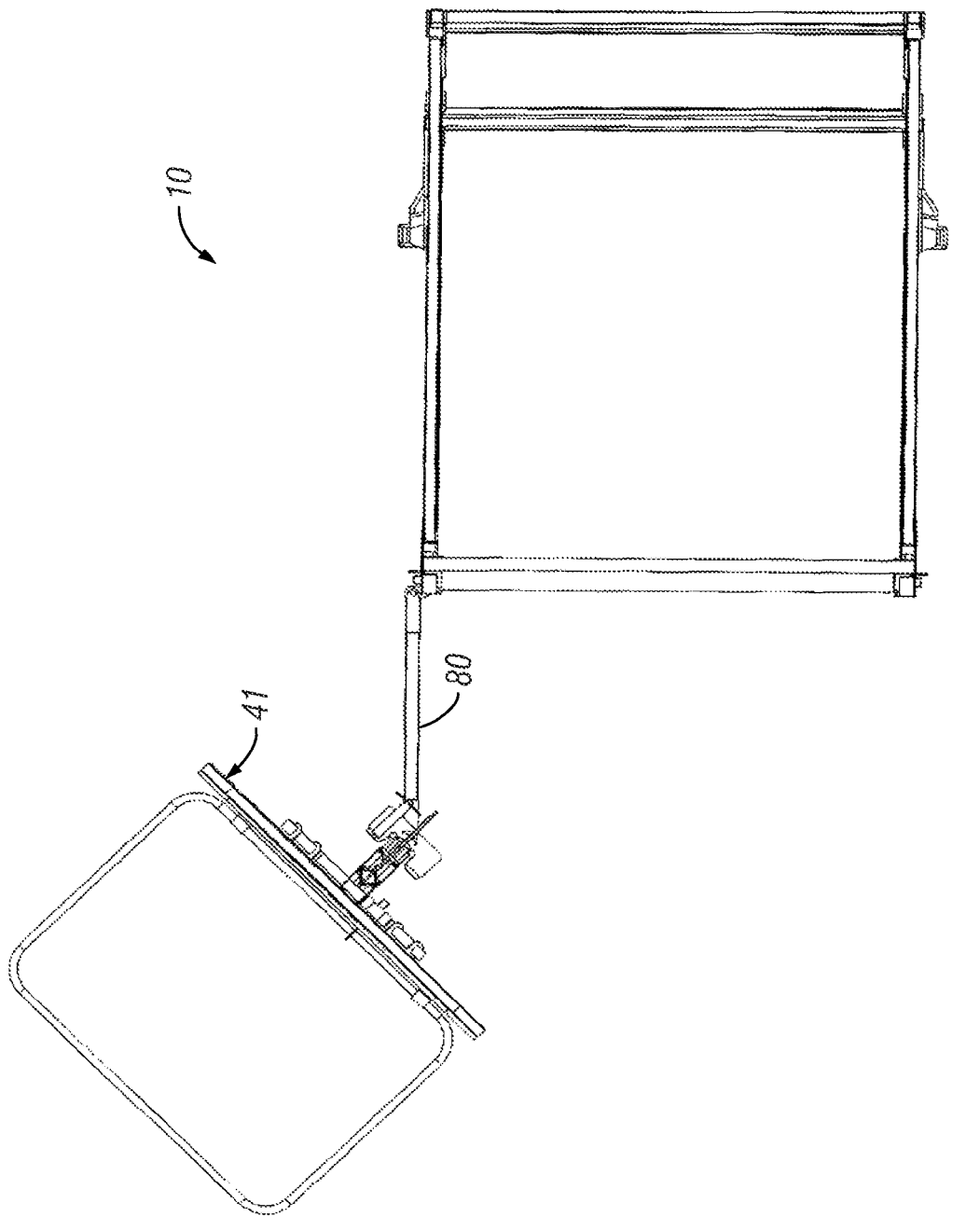
FIG. 15 is a top view of the articulated lift in a different position.
Figure 16:
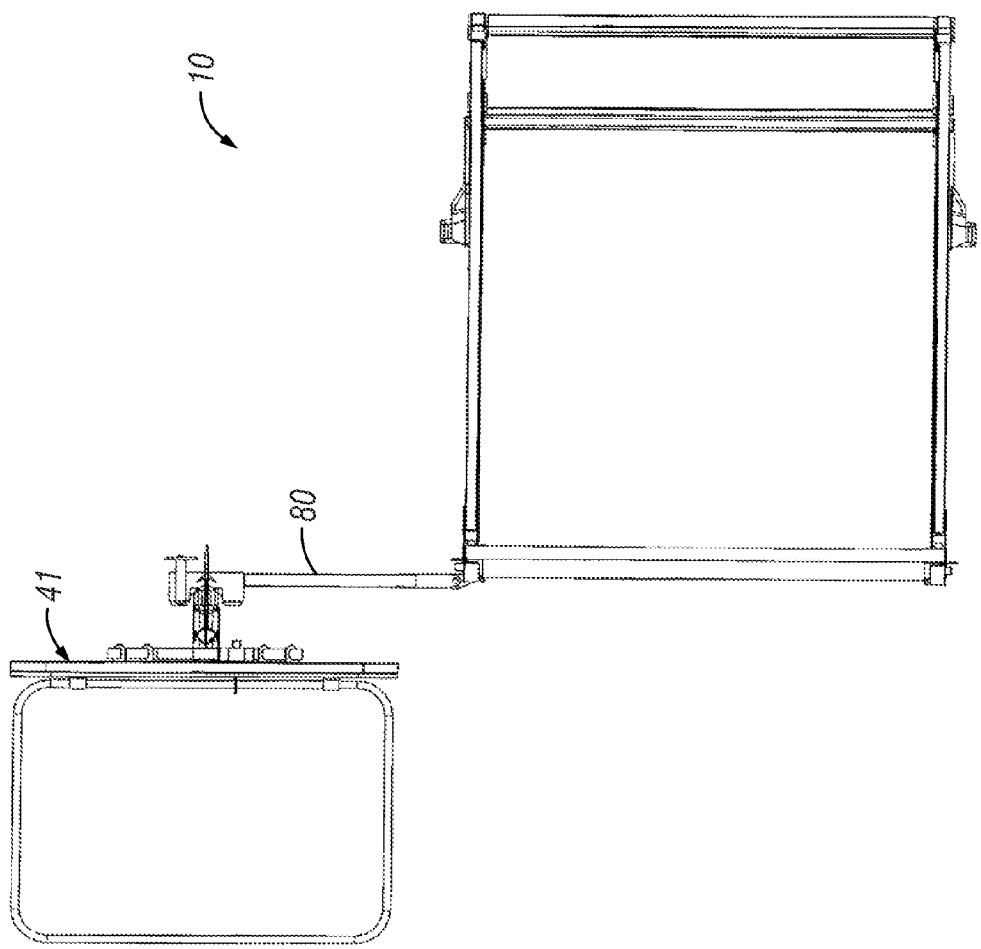
FIG. 16 is a top view of the articulated lift in a different position.
Figure 17:
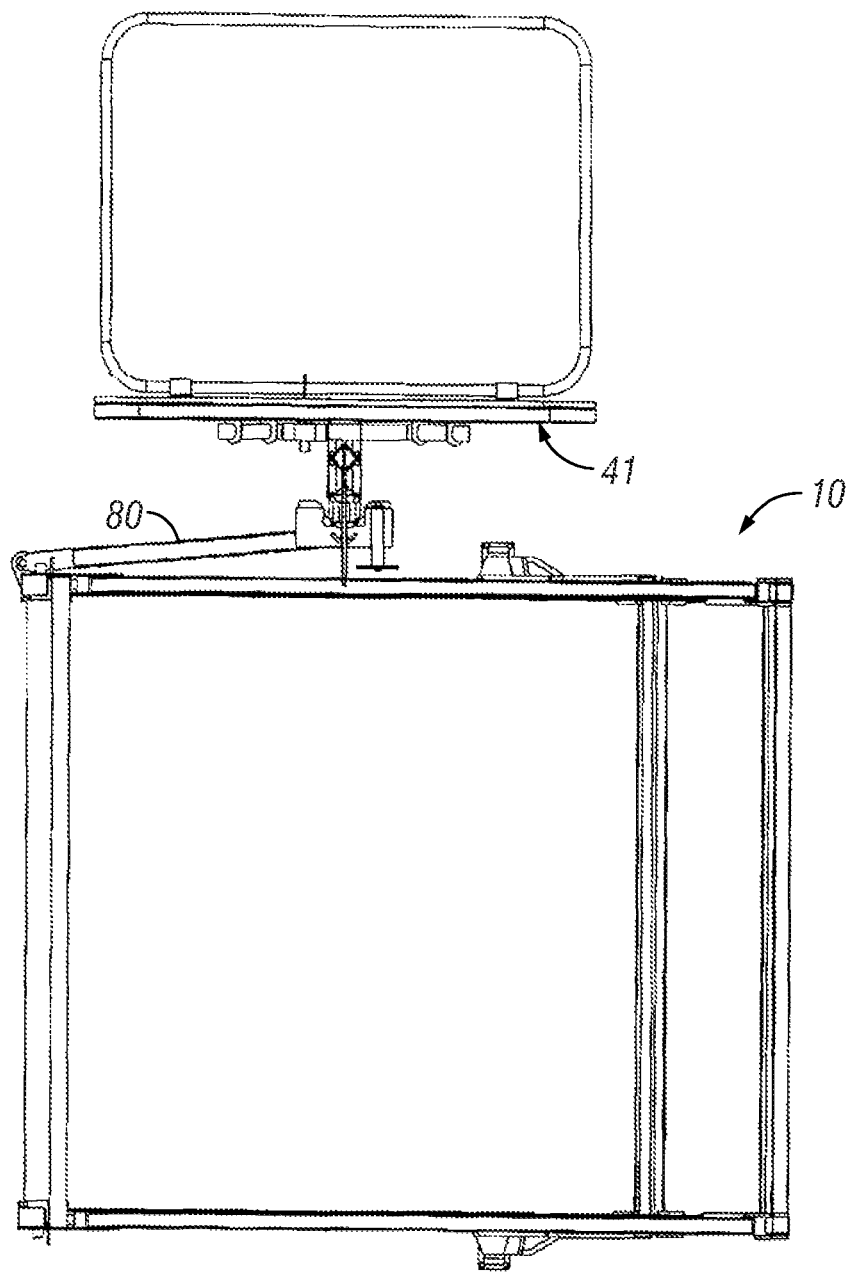
FIG. 17 is a top view of the articulated lift in a different position which would allow loading of the bin from the rear of the trailer.
Figure 18:
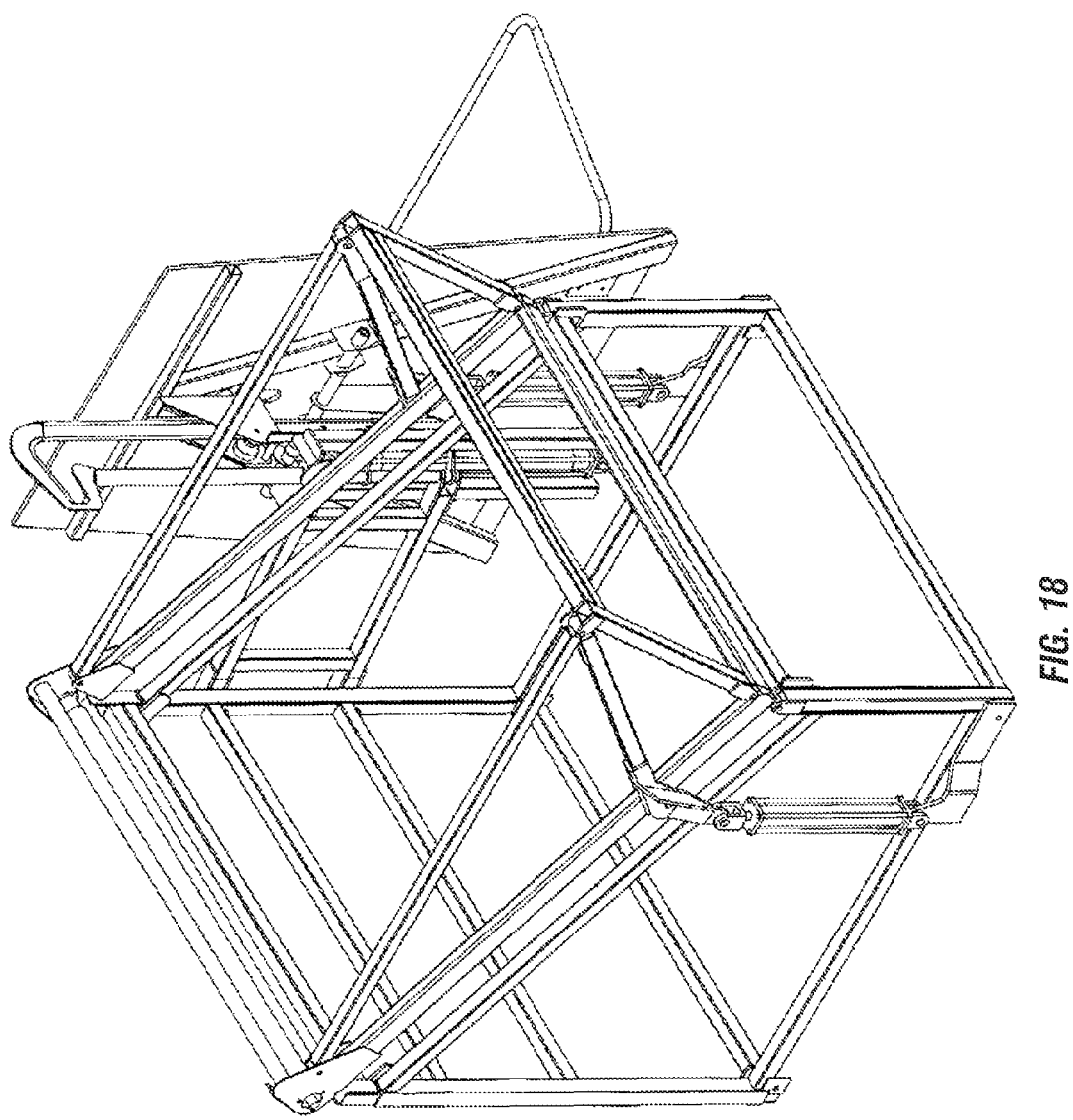
FIG. 18 is a perspective view of the articulated lift in a rear loading position.
Figure 19:
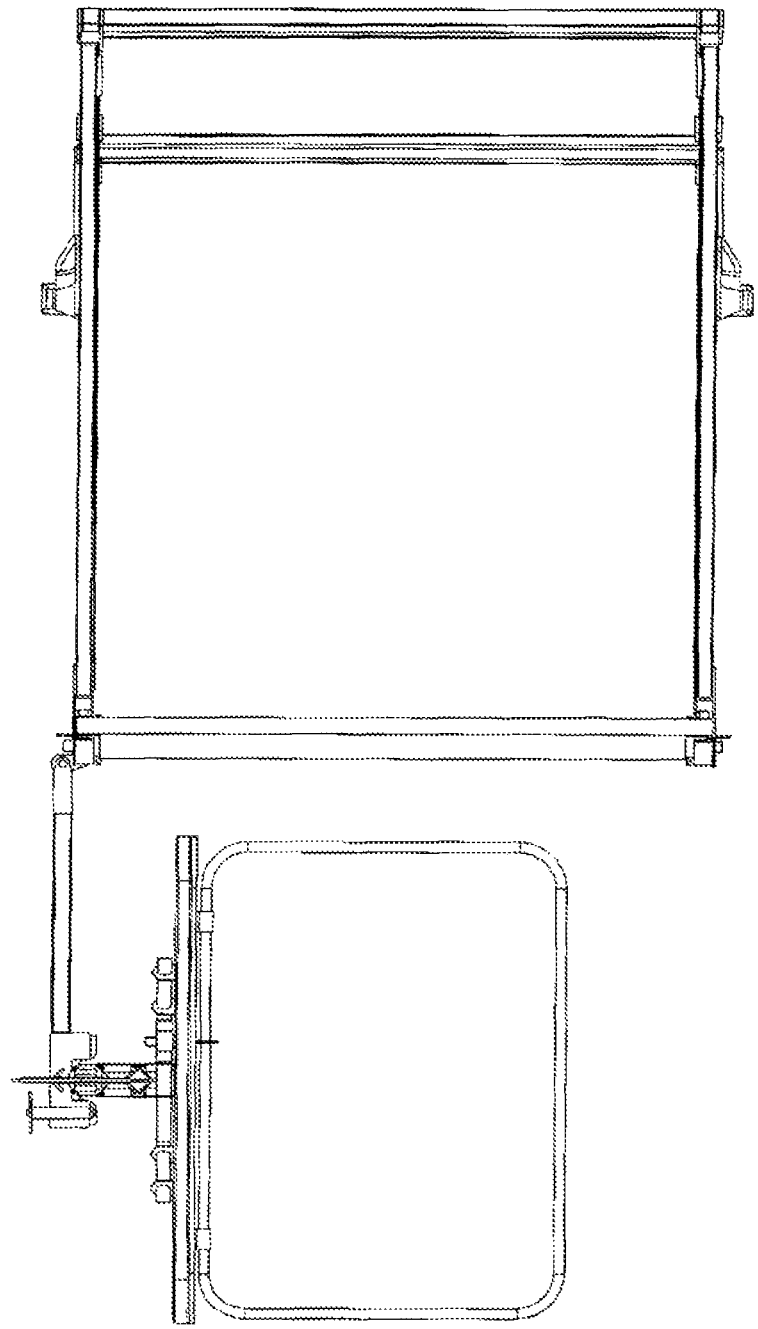
FIG. 19 is a top view of the articulated lift in another loading position.

FIG. 14 is a top view of the articulated lift in a different position with the lift starting to swing around. The articulated joint 80 multiples the utility of the lift 41. FIG. 15 is a top view of the articulated lift in a different position. FIG. 16 is a top view of the articulated lift in a different position. In this position the loader 41 could be used to a second bin or trailer. FIG. 17 is a top view of the articulated lift in a different position which would allow loading of the bin 10 from the rear of the trailer. FIG. 18 is a perspective view of the articulated lift in a rear loading position. FIG. 19 is a top view of the articulated lift in another loading position.

Figure 20:
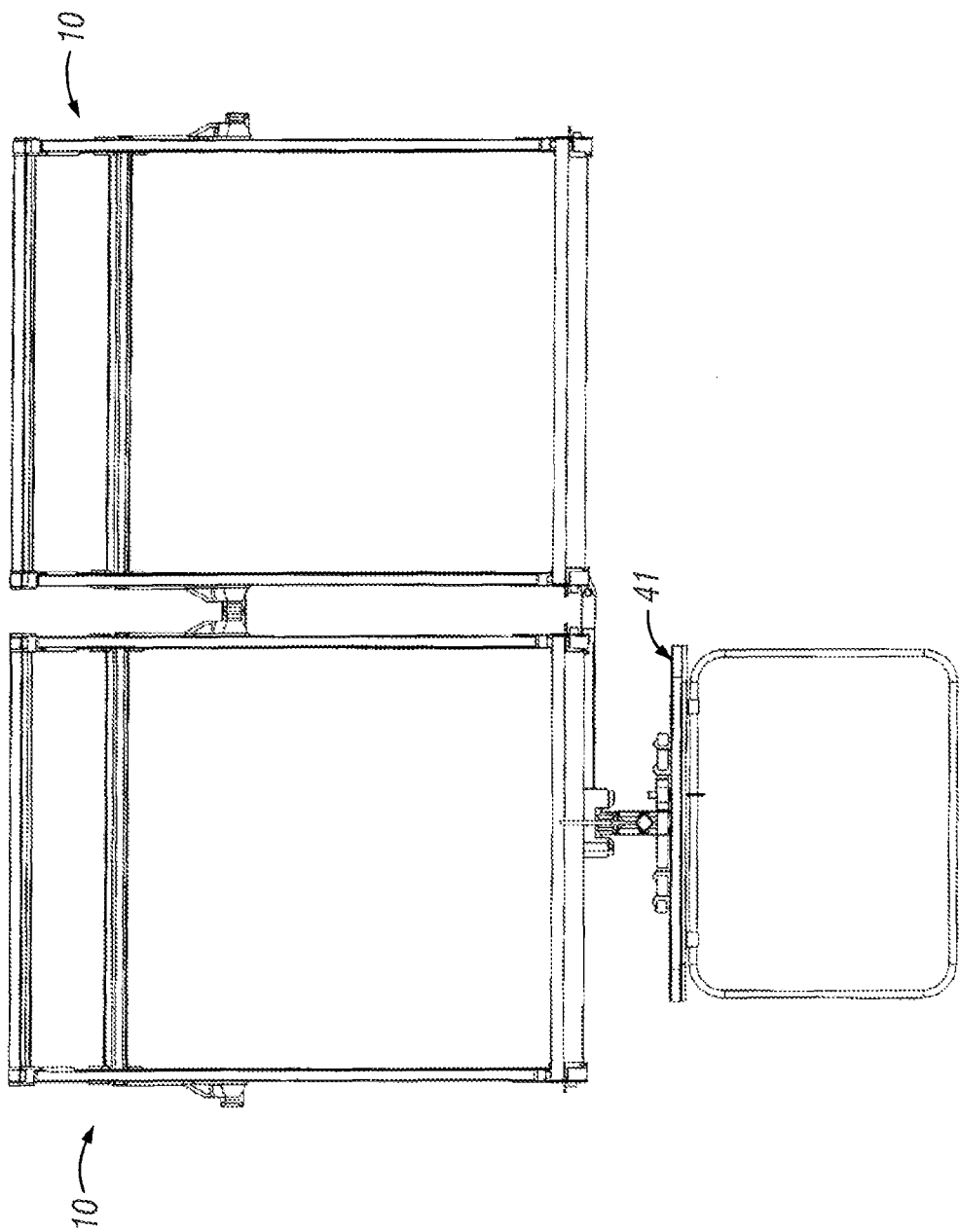
FIG. 20 is a top view of a loader used with two bins.
Figure 21:
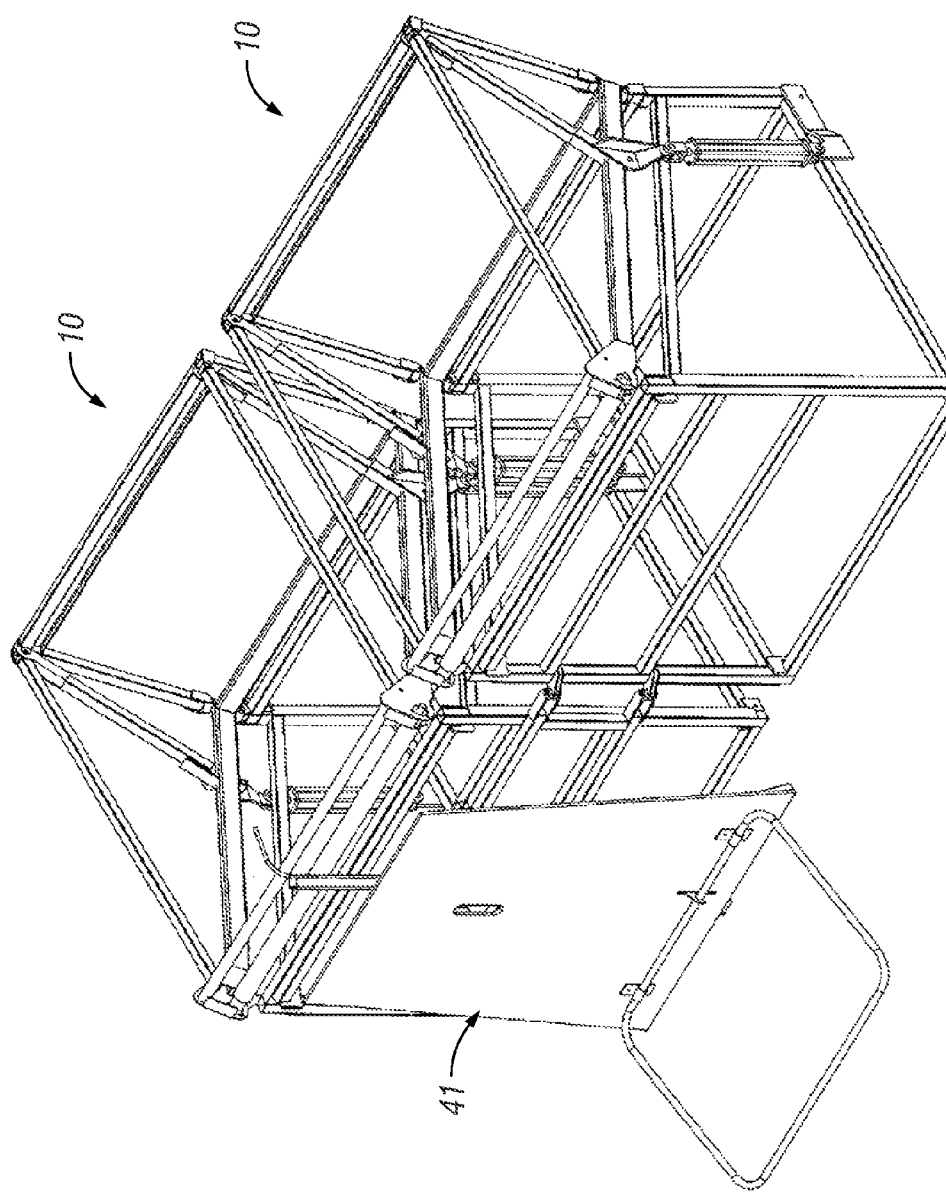
FIG. 21 is a perspective view of a loader used with two bins.
Figure 22:
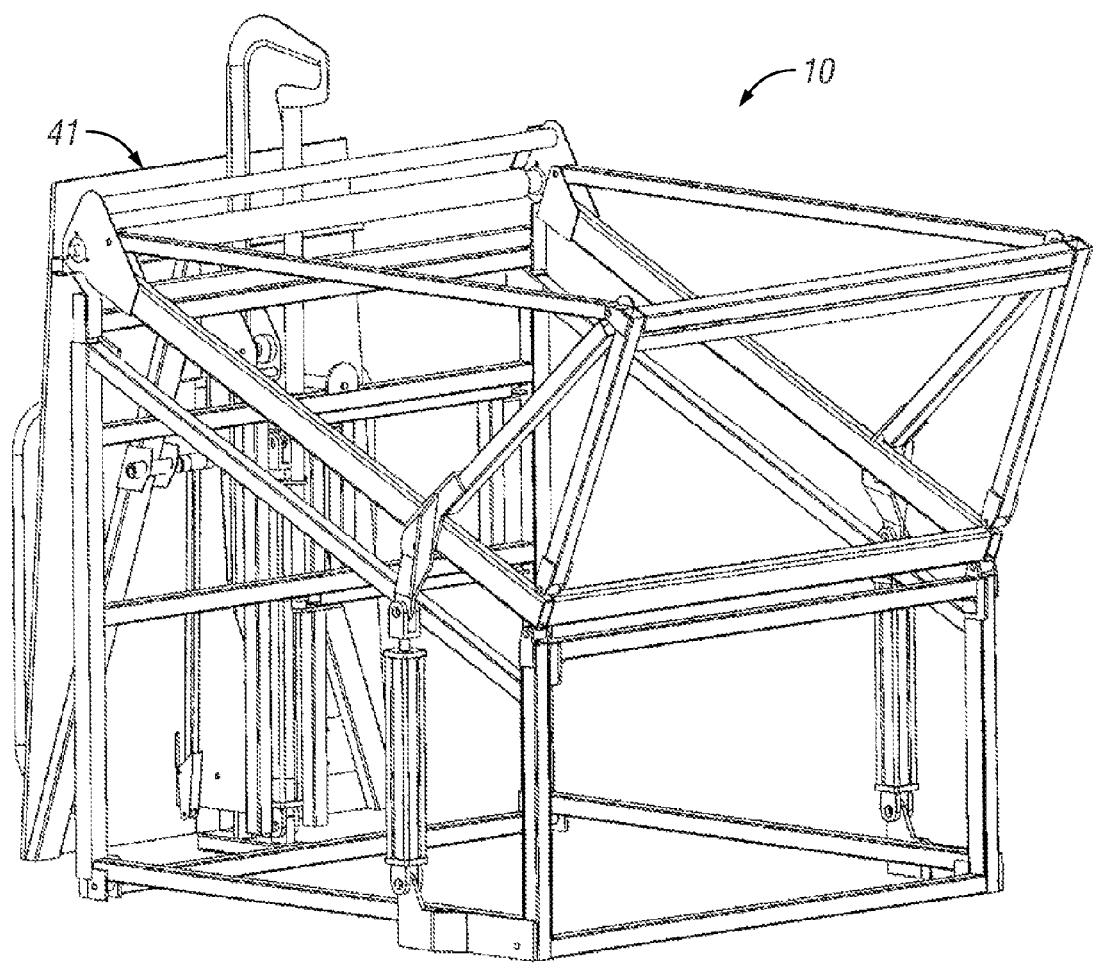
FIG. 22 is a perspective view of the bin with the loader folded for transport.
Figure 23:
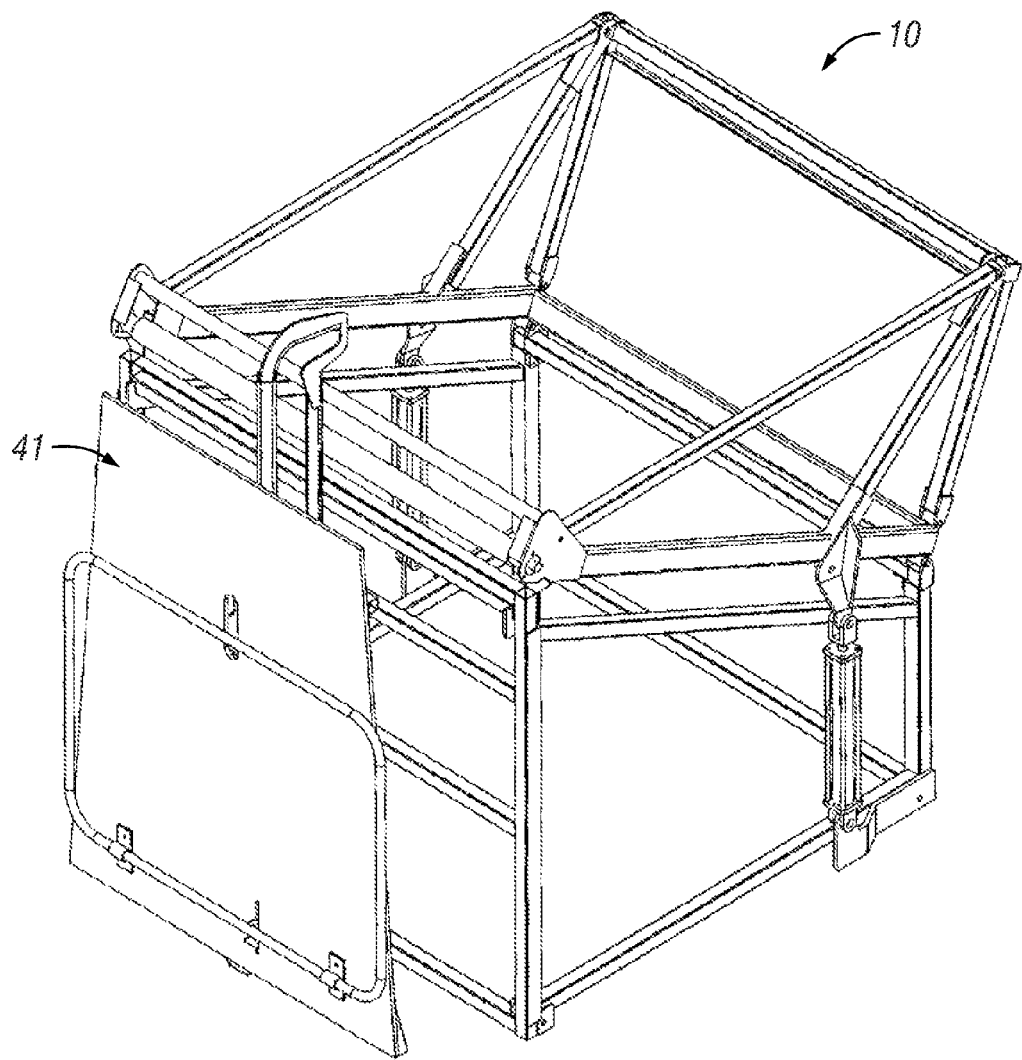
FIG. 23 is another perspective view of the bin with the loader folder up for transport.

FIG. 20 is a top view of a loader used with two bins 41. FIG. 21 is a perspective view of a loader used with two bins 41. FIG. 22 is a perspective view of the bin 10 with the loader 41 folded for transport. FIG. 23 is another perspective view of the bin 10 with the loader 41 folded up for transport.

Figure 24:
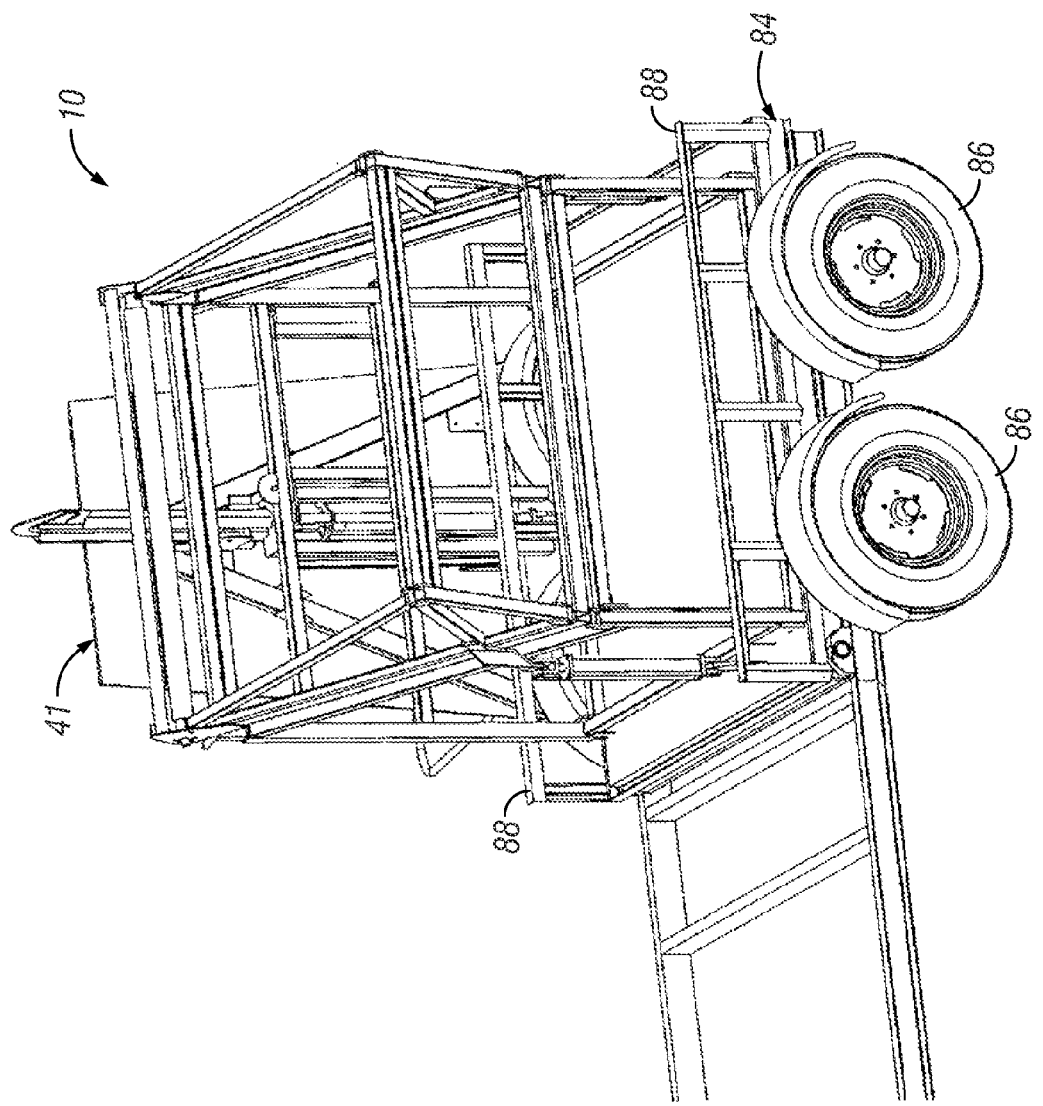
FIG. 24 is a perspective view of the bin on a trailer.
Figure 25:
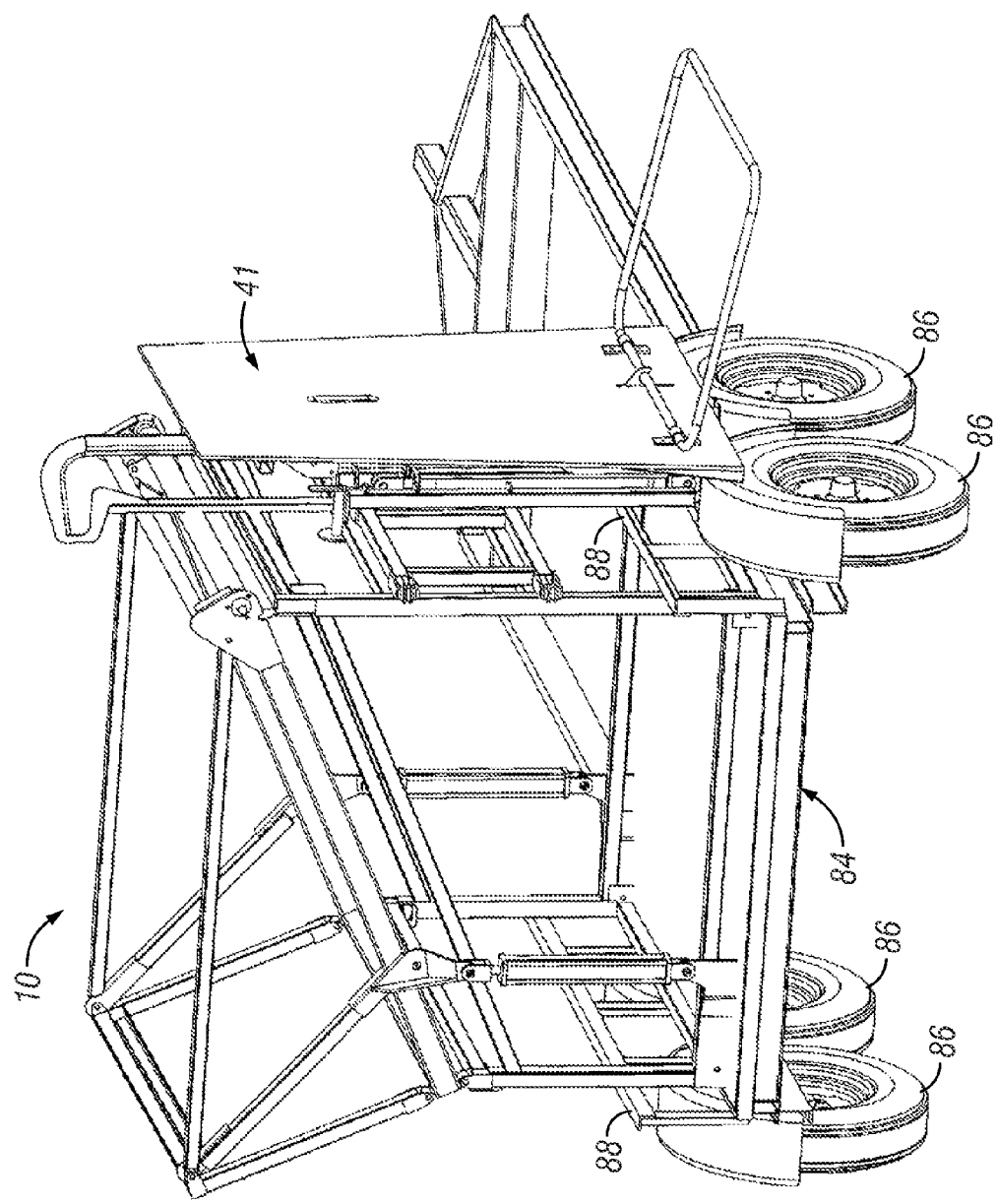
FIG. 25 is another perspective view of the bin on a trailer.

FIG. 24 is a perspective view of the bin 10 on a trailer 84. The trailer 84 has a plurality of wheels 86. The trailer 84 also includes side rails 88. FIG. 25 is another perspective view of the bin 10 on a trailer 84.

Figure 26:
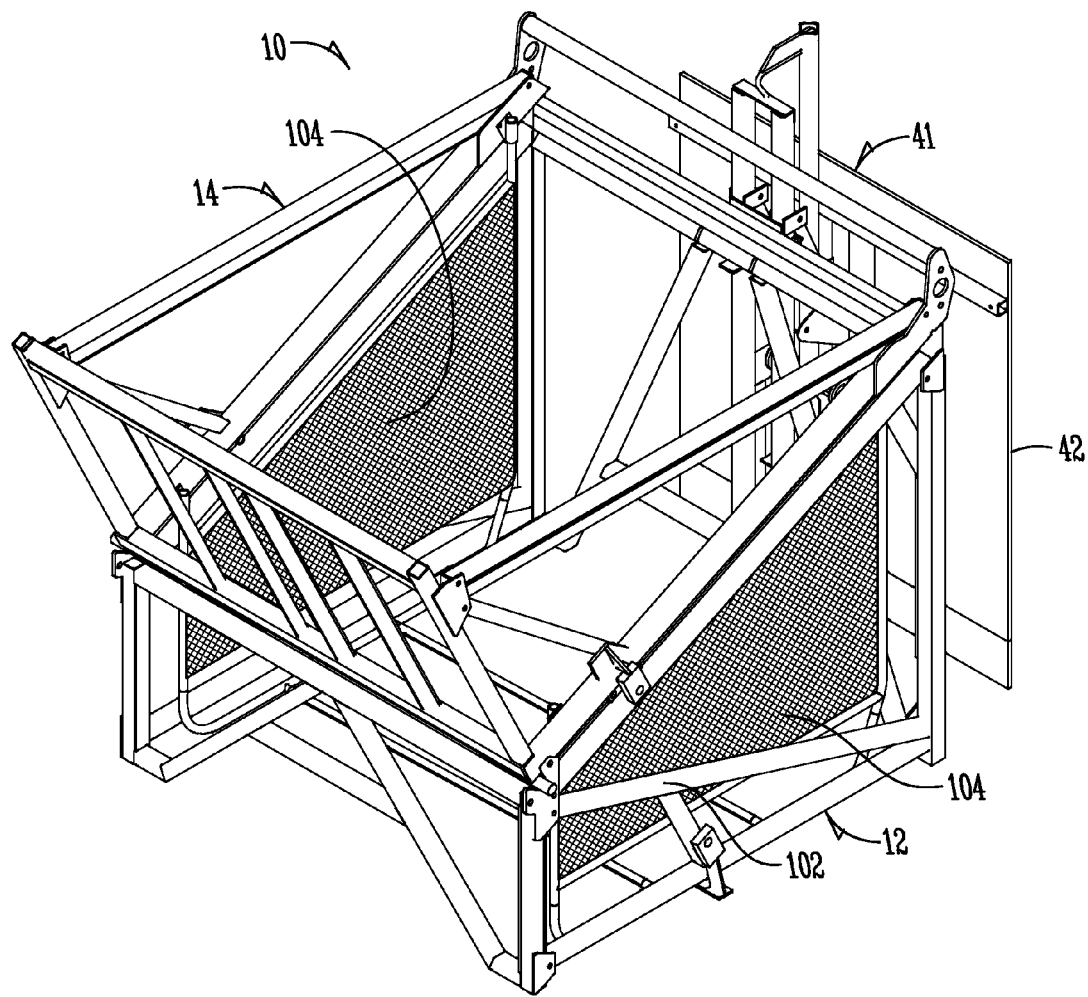
FIG. 26 is a perspective view of another embodiment of the present invention.
Figure 27:
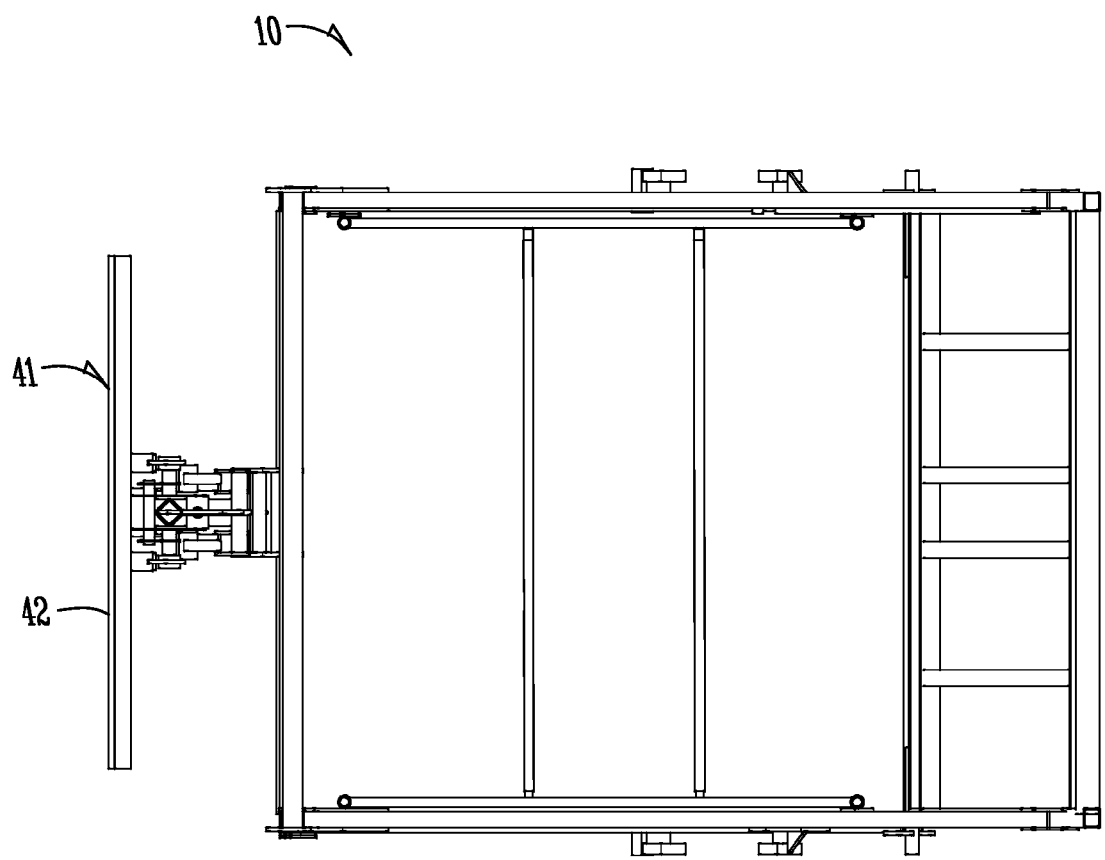
FIG. 27 is a top view of the embodiment shown in FIG. 26.
Figure 28:
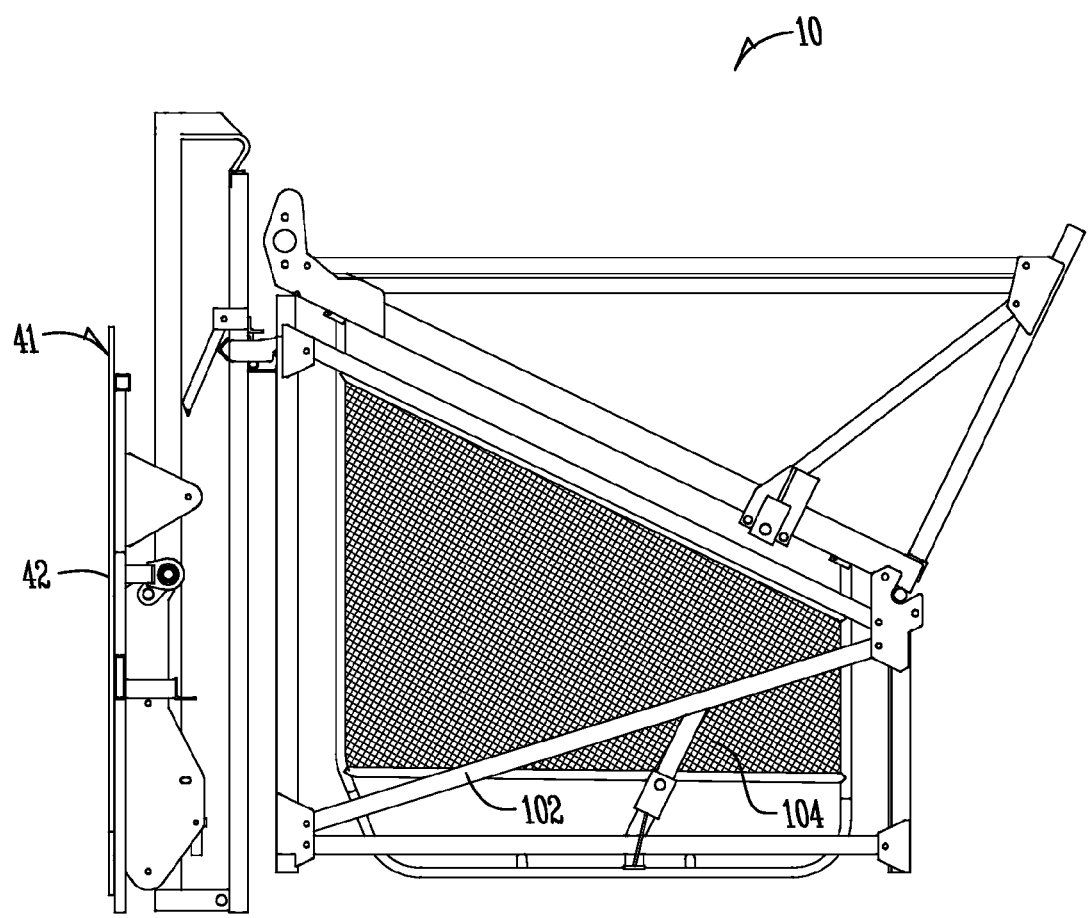
FIG. 28 is a front view of the embodiment shown in FIG. 26.
Figure 29:
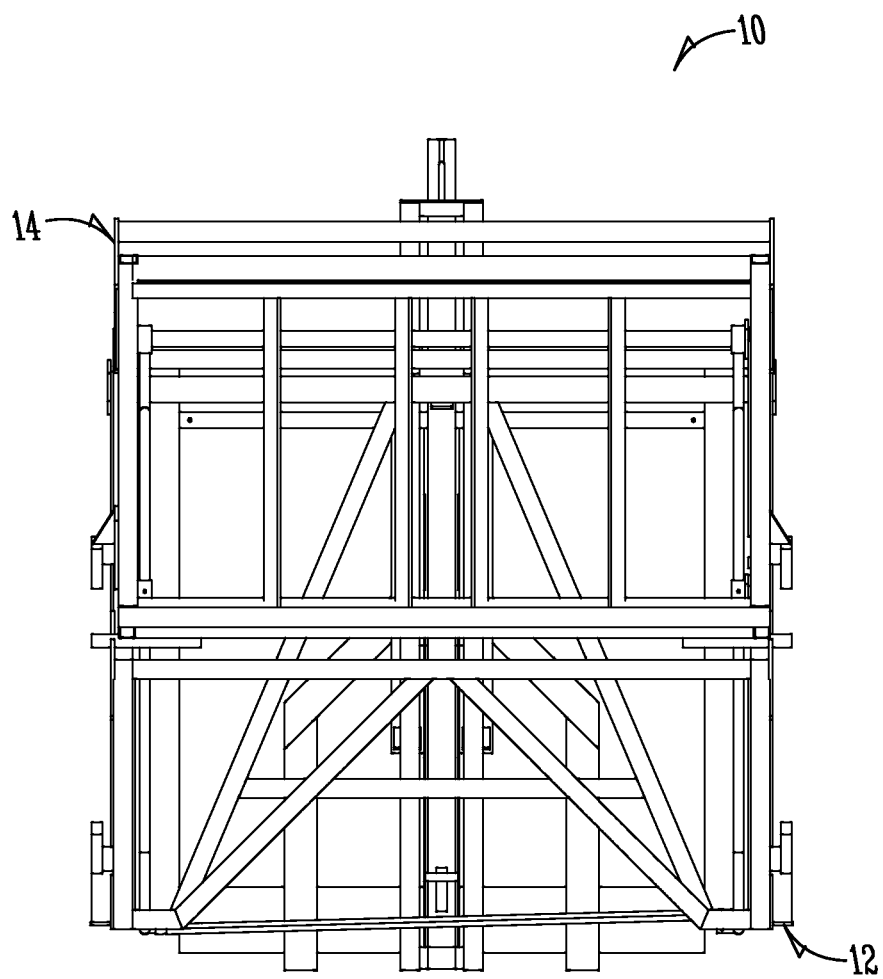
FIG. 29 is an end view of the embodiment shown in FIG. 26.

FIG. 26 is a perspective view of another embodiment of a bin. The bin 10 is similar to the bin of FIG. 1. Note, however, that bin 10 includes additional support structures such as cross member 102. The bin 10 also includes expanded metal mesh sides 104 on opposite sides of the bin to provide for further support and for retaining the storage body 70 within the bin. Also, the loader 41 has a support surface 42 which is shaped differently. FIG. 26 is a perspective view of another embodiment of the present invention. FIG. 27 is a top view of the embodiment shown in FIG. 26. FIG. 28 is a front view of the embodiment shown in FIG. 26. FIG. 29 is an end view of the embodiment shown in FIG. 26.

Figure 30:
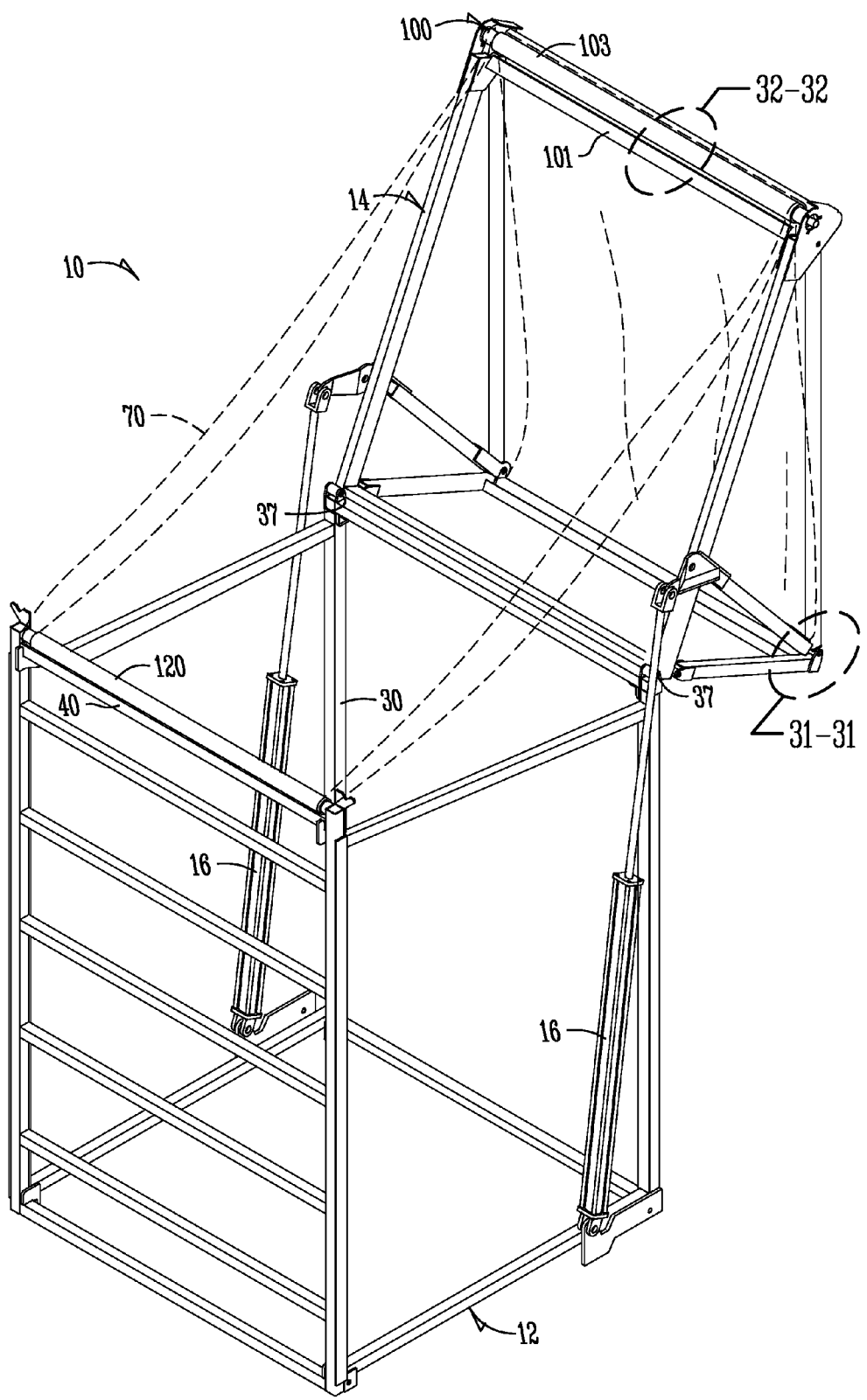
FIG. 30 is a perspective view of another embodiment of the present invention where multiple rollers are used.
Figure 31:
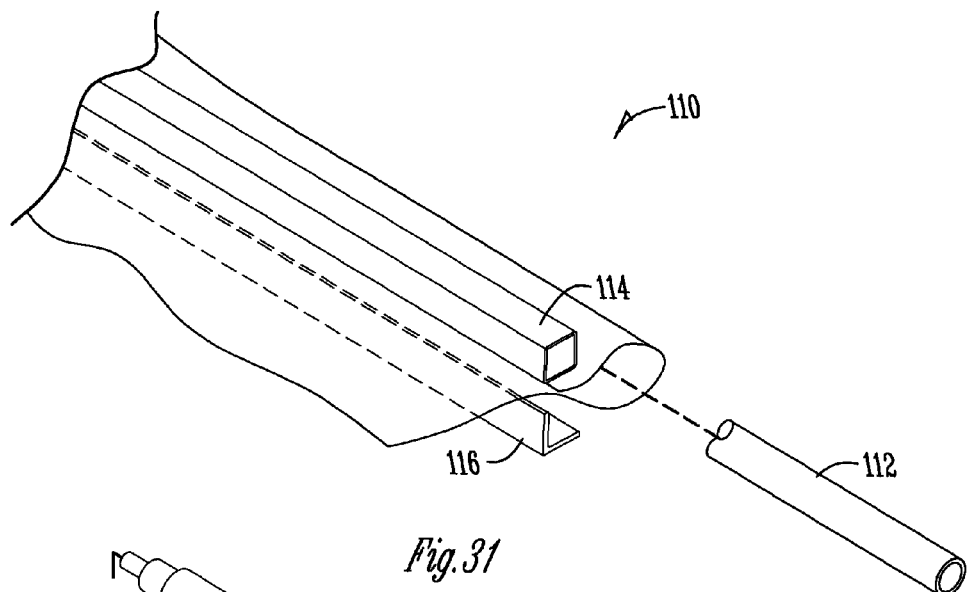
FIG. 31 is a view of the capture assembly.
Figure 32:
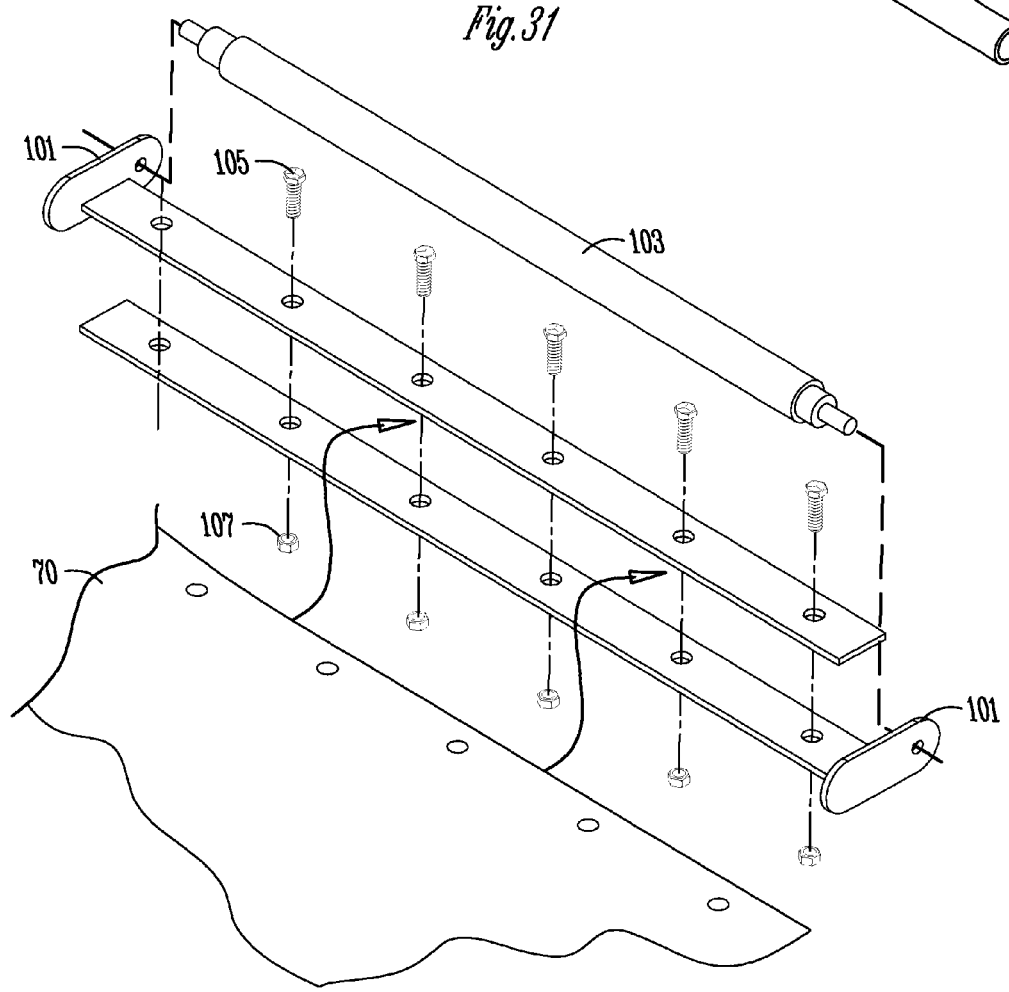
FIG. 32 is a view of the first roller assembly.

FIG. 30 is a perspective view of another embodiment of the present invention where multiple rollers are used. More than one roller may be used, particularly where the container is deep. As shown in FIG. 30, a double roller may be used. The second roller 120 is located atop member 40. Associated with the first roller assembly 100 are a roller 103 and storage body capture bars 101. The storage body capture bars 101 are adapted with a circular opening which allows the first roller to engage thereby retaining yet allowing the capture bars to swivel, rotate and change angles as necessary to keep the storage body 70 from binding. The storage body 70 is secured to the capture bars 101 by nuts 107 and bolts 105 spaced evenly across the surface. Refer to FIG. 32 for a detail view of first roller assembly 100. As seen in FIG. 31, the storage body 70 is captured by assembly 110. The storage body 70 top surface retainer 114 is preferably a square tube and the lower surface retainer 116 is angle iron, but may also be a square tube. The edge of the storage body may be hemmed to create a cylindrical opening to accept the capture rod 112. FIG. 33 is a side view which shows the storage body 70 path from capture assembly 110 to first roller assembly 100. The use of a double roller is advantageous in various configurations. For example, if it is desired to make the container deeper, while still providing for complete dumping of the container, then using a double roller allows the storage body to transition more rapidly, In addition, the hinge may located higher on the frame where a double roller is used. Note there is a desired relationship between the opening of the frame (which occurs as the upper frame hinges open relative to the lower frame) and the drawing of the storage body taut. In the desired relationship, the storage body is drawn taut proximate the top of the travel of the upper body. In a preferred embodiment, the upper frame should hinge open enough that the storage body becomes substantially upright so that even material which does not flow well is dumped from the bin. It is contemplated, however, that the upper frame need not open as fully if the bin is to be used for materials that do flow well, such as grain. It is to be further understood that any number of additional rollers may be used.

It is to be further understood that the present invention may be used for containing and dumping any number of types of materials. It is to be understood that various modifications or alterations may be made based upon the type of material. For example, the material may be a grain. Grains are generally heavier than grass clippings. Thus, when used for grains the tarp material may also be re-enforced such as with extra strips of material.

The present invention may also be used for handling of cellulosic materials, forestry products (such as wood chips or wood pellets), manure and other types of materials. Where the material to be handled is heavier (such as manure) the tarp material may be re-enforced and/or made from a heavier or stronger material. For an application such as manure, the tarp material may also be vinyl coated. In addition, in some applications it may be more desirable to have a deeper bin. In some applications, multiple bins may be used.

Therefore a shuttle bin has been disclosed. It should be appreciated that the present invention contemplates numerous variations in the relative sizes and shapes of the upper frame and lower frame. The bin may be mounted on a trailer, or on a self-propelled device or otherwise to make the bin mobile for conveying material from a first location to a second location. The present invention also contemplates that where the load contained in the storage body is relatively heavy, the storage body may be reinforced as necessary. The present invention contemplates that a backboard where used may or may not be tapered. The present invention contemplates that the lift may include an articulating joint, that a single lift may be used to fill multiple bins. These and other variations, options, and alternatives fall within the spirit and scope of the invention.

What is claimed is:

1. An apparatus configured for use on a truck bed or trailer, comprising:
   an upper frame having a first end and an opposite second end and a first side and an opposite second side, the ends and sides defining a lower perimeter of the upper frame;
   a lower frame having a first end and an opposite second end, and a first side and an opposite second side, the ends and sides of the lower frame defining an upper perimeter;
   the upper perimeter of the lower frame hingeably connected to the lower perimeter of the upper frame, such that the upper frame is pivotal between a lowered loading position and a raised dumping position;
   a pliable storage body fixed at opposite ends to the upper frame and the lower frame, respectively, at all times of use, for storing material;
   a first roller assembly operatively connected to the upper frame at the first end;
   wherein the first roller assembly is adapted to draw the storage body taut to unload the material stored in the storage body as the upper frame hinges away from the lower frame and over a side of the truck bed or the trailer;
   wherein in the loading position the first end of the upper frame is adjacent the first end of the lower frame and a top of the upper frame is open;
   wherein in the dumping position the upper frame is pivoted up and away from the first end of the lower frame such that the pliable storage body is pulled taut;
   wherein the lower perimeter of the upper frame is above the upper perimeter of the lower frame both in the loading position and the dumping position.

2. The apparatus of claim 1 wherein the pliable material is a mesh material.

3. The apparatus of claim 1 wherein the pliable material is a canvas material.

4. The apparatus of claim 1 further comprising a cylinder operatively connected between the upper frame and the lower frame for raising and lowering the upper frame.

5. The apparatus of claim 1 wherein the first roller assembly comprises a first roller and first and second storage body capture bars.

6. The apparatus of claim 1 further comprising a second idler roller assembly operatively connected to the lower frame to facilitate drawing the storage body taut as the upper frame is pivoted to the dumping position.

7. The apparatus of claim 1 wherein the pliable body extends over the first roller assembly without being fixed thereto.

8. The apparatus of claim 1 wherein the first roller assembly is an idler roller.

9. The apparatus of claim 1 wherein the first roller assembly is a non-driven roller.

10. An apparatus configured for use on a truck bed or trailer, comprising;
    an upper frame having opposite first and second ends;
    a lower frame having opposite first and second ends and hingeably connected to the upper frame;
    a cylinder operatively connected between the upper frame and the lower frame to pivot the upper frame relative to the lower frame between a lowered loading position and a raised dumping position;
    a storage body having first and second ends fixed to the upper frame and lower frame, respectively, during all times of use, the storage body formed of a pliable material;
    a first idler roller assembly operatively connected to the upper frame at the first end; and
    wherein the first idler roller assembly is adapted to draw the storage body taut as the upper frame pivots away from the lower frame toward the dumping position to unload the material stored in the storage body over a side of the truck bed or the trailer.

11. The apparatus of claim 10 wherein the storage body comprises mesh.

12. The apparatus of claim 10 wherein the storage body comprises canvas.

13. The apparatus of claim 10 wherein the first roller assembly comprises a first roller and first and second storage body capture bars.

14. The apparatus of claim 10 wherein the upper frame has a bottom perimeter and the lower frame has a top perimeter, and the bottom perimeter of the upper frame resides above the top perimeter of the lower frame in both the loading and dumping positions.

15. The apparatus of claim 10 further comprising a second idler roller assembly operatively connected to the lower frame to facilitate drawing the storage body taut as the upper frame is pivoted to the dumping position.

16. A method for operating a shuttle bin, comprising: providing a shuttle bin having (a) an upper frame with first and second ends, (b) a lower frame with first and second ends, (c) the second end of the lower frame hingeably connected to the second end of the upper frame, such that the upper frame is pivotal between a lowered loading position and a raised dumping position; (d) a pliable storage body for storing material and having opposite ends fixed to the upper frame and to the lower frame, respectively, at all times of use, (e) a first idler roller assembly operatively connected to the upper frame at the first end;
    positioning the upper frame in the loading position so that the storage body extends into the second frame; and then
    loading material onto the storage body; and then
    pivoting the upper frame away from the lower frame from the loading position to the dumping position;
    rolling the pliable storage body over the first idler roller assembly as the upper frame pivots; and
    pulling one end of the body away from the opposite end of the storage body as the upper frame moves from the loading position to the dumping position to draw the storage body taut and thereby dump material from the storage body.

17. The method of claim 16 further comprising conveying the shuttle bin from a first location to a second location before dumping the material from the pliable storage body.

18. The method of claim 16 wherein the first roller assembly comprises a first roller and first and second storage body capture bars.

19. The method of claim 16 further comprising rolling the storage body over a second idler roller assembly on the lower frame as the upper frame pivots to the dumping position.

20. The method of claim 16 further comprising maintaining a lower perimeter of the upper frame above an upper perimeter of the lower frame at all times.

* * * * *